(12) United States Patent
Takakura et al.

(10) Patent No.: US 7,860,821 B2
(45) Date of Patent: Dec. 28, 2010

(54) INFORMATION PROCESSING SYSTEM, CONTENT OUTPUT APPARATUS, AND METHOD AND PROGRAM OF CONTROLLING AN INFORMATION PROCESSING APPARATUS BY A CONTENT OUTPUT APPARATUS

(75) Inventors: Hiroki Takakura, Tokyo (JP); Shiro Miyagi, Tokyo (JP); Kou Kobayashi, Tokyo (JP); Tetsuo Morimoto, Kanagawa (JP); Kenichiro Imai, Kanagawa (JP); Katsuhiko Watanabe, Saitama (JP); Koichi Uchida, Saitama (JP)

(73) Assignee: Sony Corporation (JP)

( * ) Notice: Subject to any disclaimer, the term of this patent is extended or adjusted under 35 U.S.C. 154(b) by 458 days.

(21) Appl. No.: 11/634,709

(22) Filed: Dec. 5, 2006

(65) Prior Publication Data

US 2007/0150434 A1    Jun. 28, 2007

(30) Foreign Application Priority Data

Dec. 27, 2005  (JP) ............................ P2005-376516
Jul. 10, 2006   (JP) ............................ P2006-189365

(51) Int. Cl.
    *G06F 7/00* (2006.01)
(52) U.S. Cl. ...................... 707/600; 715/201; 709/201; 709/212
(58) Field of Classification Search ................. 707/600; 715/201–270
    See application file for complete search history.

(56) References Cited

U.S. PATENT DOCUMENTS 5,623,417 A * 4/1997 Iwasaki et al. ................ 716/18
6,084,978 A * 7/2000 Taylor et al. ................ 382/154
6,810,441 B1 * 10/2004 Habuto et al. ................ 710/20
6,832,275 B1 * 12/2004 Aizawa ........................ 710/62
6,961,922 B1 * 11/2005 Knutson ...................... 717/109

(Continued)

FOREIGN PATENT DOCUMENTS

CN    1448880 A    10/2003

(Continued)

OTHER PUBLICATIONS

European Search Report, EP 06266265, dated Apr. 24, 2009.

(Continued)

*Primary Examiner*—Don Wong
*Assistant Examiner*—Tuan-Khanh Phan
(74) *Attorney, Agent, or Firm*—Lerner, David, Littenberg, Krumholz & Mentlik, LLP

(57) ABSTRACT

In an information processing system including an information processing apparatus and a content output apparatus which are connected to each other, the content output apparatus is configured to include a function identification file creation unit adapted to, in accordance with a button operation by a user, create a function identification file for causing the information processing apparatus to execute a predetermined function, and a file storage unit adapted to store the function identification file in a storage unit, and the information processing apparatus is configured to include a detector adapted to detect a connection of the content output apparatus to the information processing apparatus, and a controller adapted to, after detecting the connection of the content output apparatus, start an application program to execute the function depending on the presence/absence of the function identification file in the storage unit.

17 Claims, 17 Drawing Sheets

U.S. PATENT DOCUMENTS

| | | | |
|---|---|---|---|
| 7,296,238 B1* | 11/2007 | Zurawski | 715/763 |
| 2002/0147989 A1 | 10/2002 | Kessler | |
| 2003/0110320 A1* | 6/2003 | Ono et al. | 710/1 |
| 2004/0174443 A1* | 9/2004 | Simske | 348/231.3 |
| 2004/0201688 A1 | 10/2004 | Wolf et al. | |

FOREIGN PATENT DOCUMENTS

| | | |
|---|---|---|
| CN | 1570881 A | 1/2005 |
| EP | 1484686 A1 | 12/2004 |
| JP | 2003-259274 A | 9/2003 |
| JP | 2004-094815 A | 3/2004 |

OTHER PUBLICATIONS

Anonymous: "Digital Video Camera Recorder Operating instructions" Online Article, 2003. p. 1,32-36,230-232.

Bell A E et al: "Next generation DVD: application requirements and technology" Signal Processing Image Communication, Elsevier Science Publishers, Amsterdam, vol. 19, No. 9, (Oct. 1, 2004), pp. 909-920.

Anonymous: "Sony announces DCR-PC105, Replacing the DCR-PC101" Online Article, (May 5, 2003), pp. 1-4.

* cited by examiner

| FIELD | SIZE | DATA |
|---|---|---|
| ID | 1 byte | NONY |
| MODEL NAME | 1 byte | DCR-SR100 |
| ⋮ | ⋮ | ⋮ |
| ONE-TOUCH OPERATION SETTING | 1 byte | HD,SD,HD/SD |
| ⋮ | ⋮ | ⋮ |

US 7,860,821 B2

INFORMATION PROCESSING SYSTEM, CONTENT OUTPUT APPARATUS, AND METHOD AND PROGRAM OF CONTROLLING AN INFORMATION PROCESSING APPARATUS BY A CONTENT OUTPUT APPARATUS

CROSS REFERENCES TO RELATED APPLICATIONS

The present invention contains subject matter related to Japanese Patent Applications JP 2005-376516 filed in the Japanese Patent Office on Dec. 27, 2005 and JP 2006-189365 filed in the Japanese Patent Office on Jul. 10, 2006, the entire contents of which are incorporated herein by reference.

BACKGROUND OF THE INVENTION

1. Field of the Invention

The present invention relates to an information processing system, a content output apparatus, and a method and program of controlling an information processing apparatus by a content output apparatus, and more particularly, to an information processing system, a content output apparatus, and a method and program of controlling an information processing apparatus by a content output apparatus, which are advantageously applicable to, for example, a system including a disk drive and a personal computer.

2. Description of the Related Art

In a technique of using a disk drive as an audio data recording/playing back apparatus and also as a storage device of a personal computer or the like, it is known to control the operation mode thereof such that when the disk drive is connected to the personal computer, the disk drive is automatically set to operate as the audio data recording/playing back apparatus or as the storage device depending on whether a particular application is running on the personal computer (see, for example, Japanese Unexamined Patent Application Publication No. 2004-94815).

SUMMARY OF THE INVENTION

In the disk drive configured so as to operate in the above-described manner, when the disk drive is connected to the personal computer, the personal computer operates as a master device and the disk drive operates as a slave device. In this state, in general, the disk drive is treated as a simple storage device and the disk drive operating as the slave device is not allowed to control the personal computer operating as the master device.

To allow the disk drive operating as the slave device to control the personal computer operating as the master device, a special driver and a complicated configuration are necessary.

In view of the above, the present invention provides an information processing system, a content output apparatus, and a method and a program of controlling an information processing apparatus by a content output apparatus, configured in a simple form and capable of allowing the content output apparatus serving as a slave device to control the information processing apparatus serving as a master device to execute a particular function.

According to an embodiment of the present invention, there is provided an information processing system including an information processing apparatus and a content output apparatus which are connected to each other, in which the content output apparatus includes function identification file creation means for, in accordance with a button operation by a user, creating a function identification file for causing the information processing apparatus to execute a predetermined function, and file storage means for storing the function identification file in storage means, and the information processing apparatus includes detection means for detecting a connection of the content output apparatus to the information processing apparatus, and control means for, after detecting the connection of the content output apparatus, starting an application program to execute the function depending on the presence/absence of the function identification file stored in the storage means.

This configuration of the system makes it possible for the information processing apparatus to start the application program to execute the particular function specified by the function identification file simply by checking whether there is the function identification file created by the content output apparatus.

According to another embodiment of the present invention, there is provided an information processing system including an information processing apparatus and a content output apparatus which are connected to each other, in which the content output apparatus includes function identification file creation means for creating a function identification file for causing the information processing apparatus to record, on a recording medium, content data stored in the content output apparatus, type identification file creation means for, if a content type of content data to be recorded on the recording medium is selected, creating a type identification file in which type information indicating the content type is described, and file storage means for storing the function identification file and the type identification file in storage means, and the information processing apparatus includes detection means for detecting a connection of the content output apparatus to the information processing apparatus, and control means for, after detecting the connection of the content output apparatus, starting an application program to record the content data on the recording medium depending on the presence/absence of the function identification file stored in the storage means, and recording on the recording medium the content data stored in the content output apparatus in accordance with the type information described in the type information file.

In this information processing system, the information processing apparatus determines whether there is the function identification file created by the content output apparatus and records content data output by the content output apparatus on a recording medium of a type corresponding to the content type indicated by the type information described in the type information file.

As can be seen from the above-description, the present invention provides great advantages. That is, the information processing apparatus is capable of starting the application program to execute the particular function corresponding to the function identification file simply by determining whether there is the function identification file created by the content output apparatus. Thus, the present invention allows it to realize the information processing system, the content output apparatus, and the method and the program of controlling the information processing apparatus by the content output apparatus, which are configured in a simple form so as to allow the content output apparatus to control the information processing apparatus to execute the particular function.

The present invention also allows it to realize the information processing system, the content output apparatus, and the method and the program of controlling the information processing apparatus by the content output apparatus, in which the information processing apparatus determines whether there is the function identification file created by the content output apparatus, and records content data output from the content output apparatus on a recording medium of a type corresponding to the content type indicated by the type information described in the type identification file.

DESCRIPTION OF THE PREFERRED EMBODIMENTS

The present invention is described in detail below with reference to embodiments in conjunction with the accompanying drawings.

First Embodiment

General Configuration of Information Processing System

Figure 1:
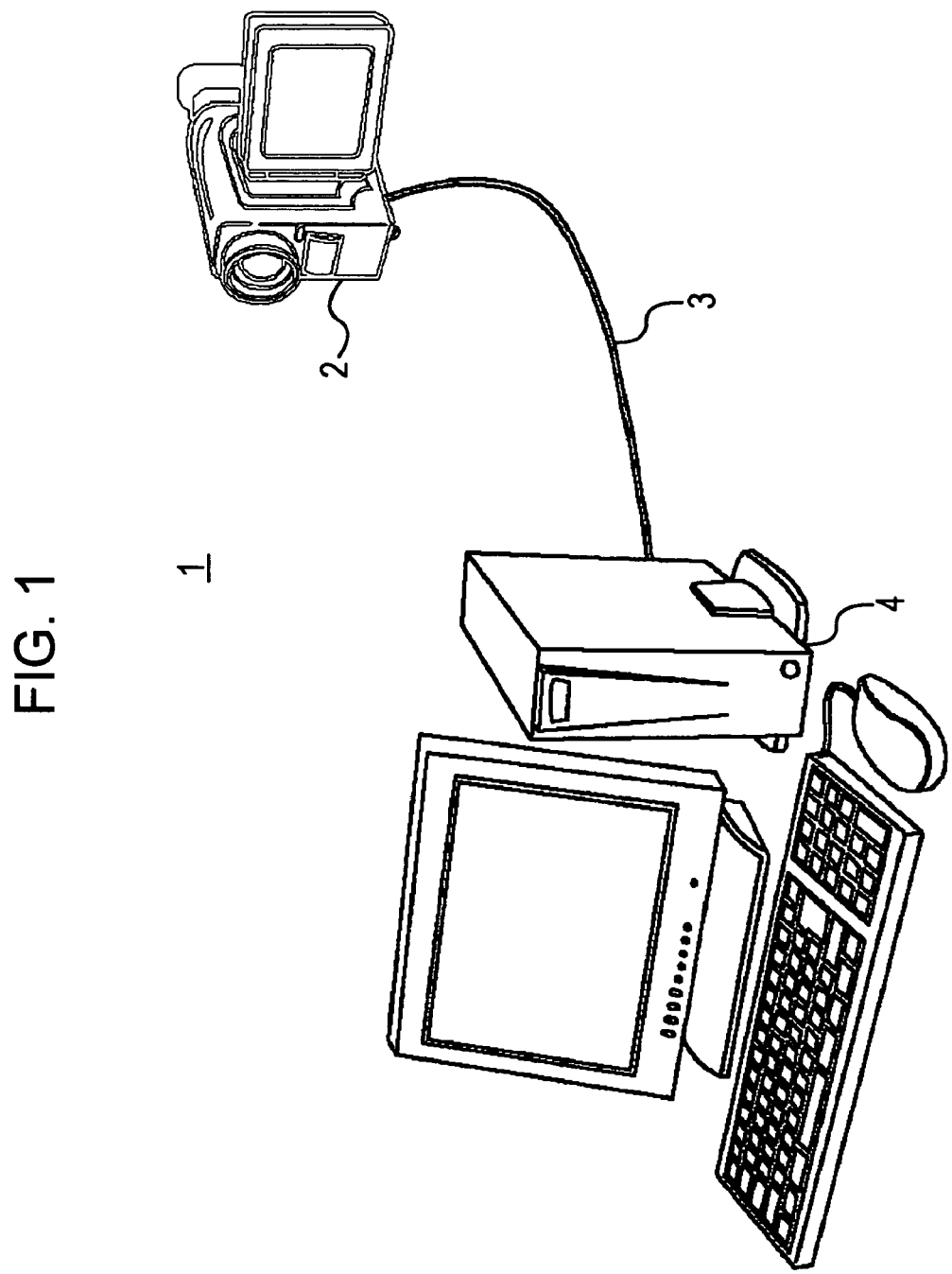
FIG. 1 is a perspective view schematically showing a general configuration of an information processing system according to an embodiment of the present invention.

As shown in FIG. 1, an information processing system 1 according to a first embodiment of the invention includes an HDD (Hard Disk Drive) video camera 2 configured to take an image and store the image in the form of a moving image file or a still image file on a built-in hard disk drive, and a personal computer 4 connected to the HDD video camera 2 via a communication interface such as a USB (Universal Serial Bus) cable 3 or the like.

When the HDD video camera 2 is connected to the personal computer 4 via the USB cable 3, the personal computer 4 operates as a master device, and the HDD video camera 2 is simply treated as a storage device. In this state, by using an application program installed on the personal computer 4, the personal computer 4 is capable of capturing the moving image file or the still image file from the HDD video camera 2 and storing it for backup in the personal computer 4 or printing an image according to the captured moving image file or the still image file.

That is, when the HDD video camera 2 and the personal computer 4 are connected to each other via the USB cable 3, the personal computer 4 operates as the master device and the HDD video camera 2 operates the slave device, and thus, in general, the HDD video camera 2 is not allowed to directly control the personal computer 4.

However, in the information processing system 1 according to an embodiment of the present invention, the HDD video camera 2 operating as the slave device is allowed to indirectly control the personal computer 4 operating as the master device to store a moving image file or a still image file output from the HDD video camera 2 in the personal computer 4 or on a DVD disk or the like by using the personal computer 4.

In the information processing system 1 according to the present embodiment, it is assumed that the HDD video camera 2 is connected to the personal computer 4 via a communication interface using a cable such as a USB cable 3. Alternatively, the HDD video camera 2 may be connected to the personal computer 4 via a wireless communication interface such as a Bluetooth (trademark) module or an IEEE (Institute of Electrical and Electronics Engineers) 802.11g wireless communication module.

Circuit Configuration of the HDD Video Camera

Figure 2:
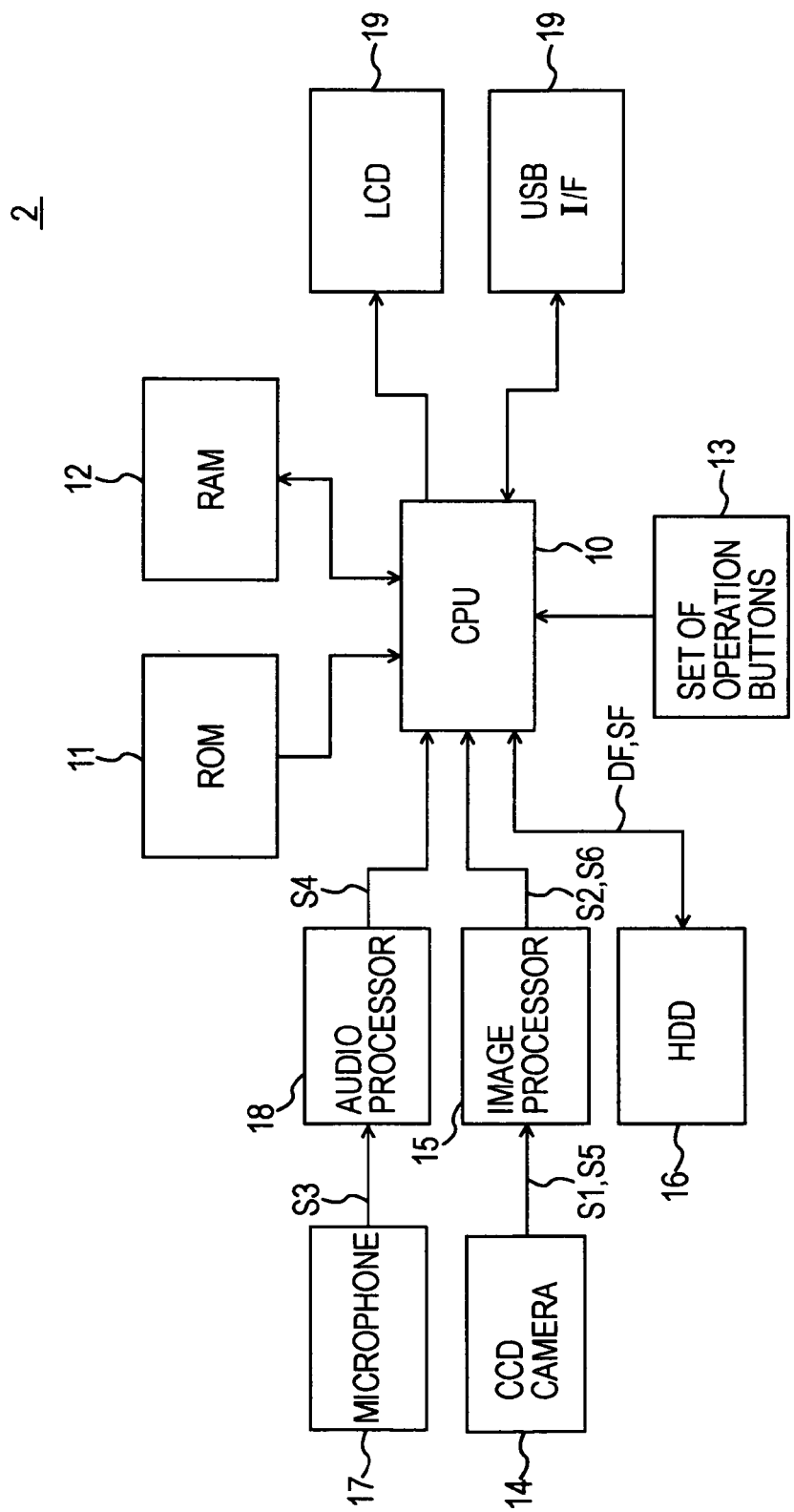
FIG. 2 is a schematic block diagram showing a circuit configuration of an HDD video camera according to an embodiment of the present invention.

As shown in FIG. 2, the HDD video camera 2 operates with electric power supplied by a battery (not shown). A CPU (Central Processing Unit) 10 loads a basic program and various kinds of application programs from a ROM (Read Only Memory) 11 into a RAM (Random Access Memory) 12 and controls the whole HDD video camera 2 in accordance with the basic program and various kinds of application programs loaded in the RAM 12. In response to pressing of one of a set of operation buttons 13 by a user, the CPU 10 performs various processes such as capturing of an image, a playback process, an editing process, etc. depending on which one of the set of buttons is pressed.

More specifically, when a particular one of the set of operation buttons 13 is pressed by a user to take an image, the CPU 10 of the HDD video camera 2 performs particular image processing, using an image processor 15, on image data S1 output from a CCD (Charge Coupled Device) camera 14, and image data S2 is obtained as a result.

Concurrently, the CPU 10 of the HDD video camera 2 converts audio data S3 detected by the microphone 17 into audio data S4 by performing audio processing using the audio processor 18.

The CPU 10 of the HDD video camera 2 produces a moving image file DF including SD image data S2 and associated audio data S4 and the stores the generated moving image file DF in the hard disk drive 16.

In the HDD video camera 2, when still image data S5 is captured via the CCD camera 14, the CPU 10 performs image processing on the still image data S5 using the image processor 15. Still image data S6 obtained as a result of the image processing is stored as a still image file SF in the hard disk drive 16.

When a user presses a particular one of the set of buttons 13, the CPU 10 of the HDD video camera 2 reads the moving image file DF or the still image file SF, depending on the pressed button, from the HDD 16 and displays a moving image or a still image on a LCD (Liquid Crystal Display) 19 in accordance with the moving image file DF or the still image file SF.

The CPU 10 of the HDD video camera 2 is connected to the personal computer 4 via the USB interface 20 and the USB cable 3 (FIG. 1) so that the moving image file DF and/or the still image file SF can be transferred from the HDD video camera 2 to the personal computer 4 and saved therein or the moving image file DF and/or the still image file SF can be recorded on a removable recording medium such as a DVD (Digital Versatile Disc) via the personal computer 4. Note that the recording medium is not limited to the DVD disk but other types of recording media such as a CD-R (Compact Disc-Recordable) disk or a flash memory may also be used.

Circuit Configuration of the Personal Computer

Figure 3:
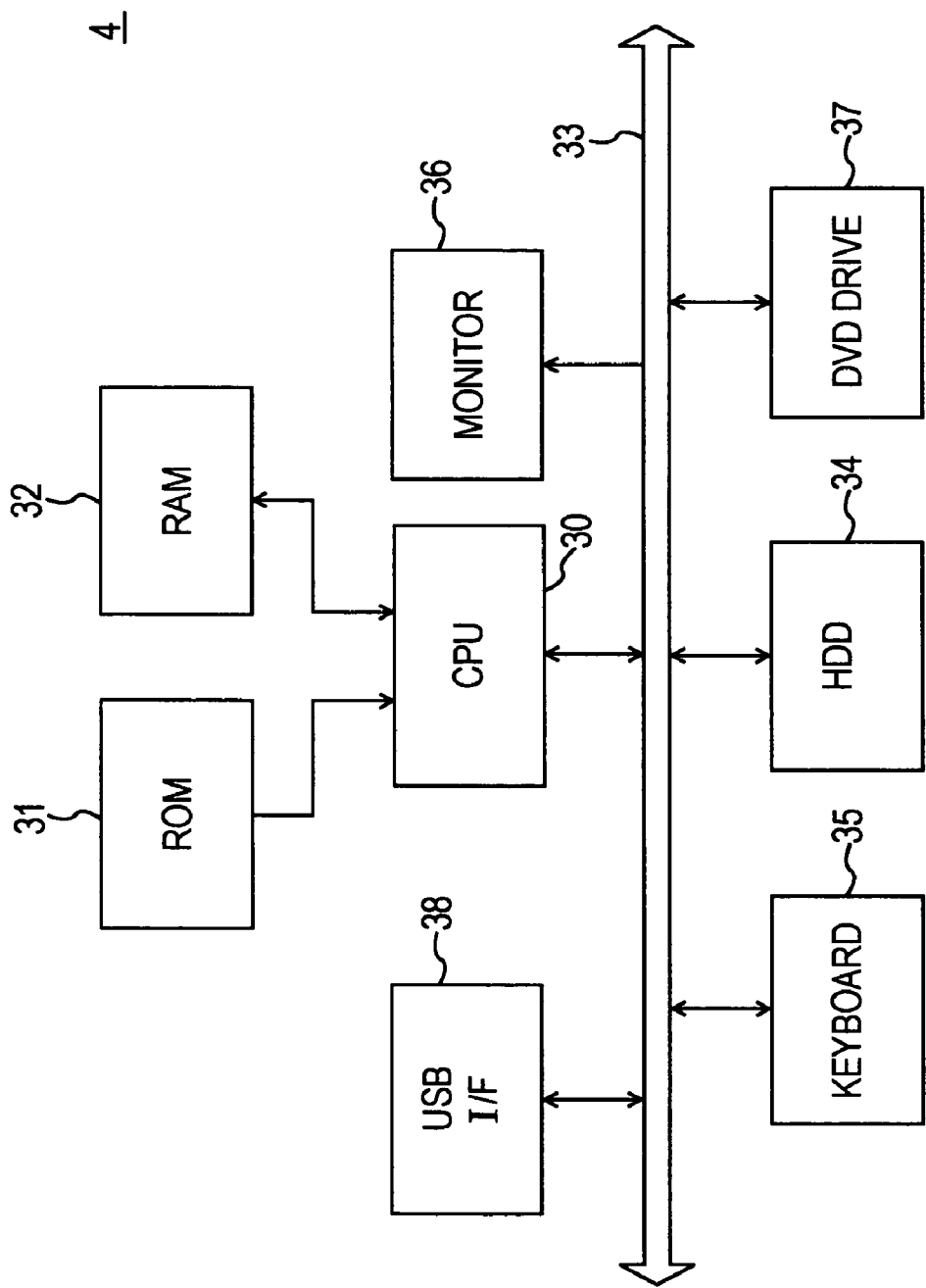
FIG. 3 is a schematic block diagram showing a circuit configuration of a personal computer.

In the personal computer 4, as shown in FIG. 3, the CPU 30 loads a basic program and various kinds of application programs from a ROM 31 or a hard disk drive 34 into a RAM 32 and controls the whole personal computer 4 in accordance with the basic program and the various kinds of application program loaded in the RAM 32. For example, the CPU 30 performs various processes in response to inputting operations, performed by a user, on a keyboard 35 and displays a result on a monitor 36 connected via a bus 33.

The personal computer 4 has a DVD drive 37 and is capable of reading data from a DVD disk mounted on the DVD drive 37 and displaying the data on the monitor 36. The personal computer 4 is also capable of capturing a moving image file DF or a still image file SF from the HDD video camera 2 connected via the USB interface 38 and the USB cable 3 (FIG. 1) and writing the captured moving image file DF or still image file SF on the hard disk drive 34 or on a DVD disk mounted on the DVD drive 37.

Sequence of Processes of Writing Data on DVD Disk under Indirect Control of HDD Video Camera In the information processing system 1, when the HDD video camera 2 is connected to the personal computer 4 via the USB cable 3, the HDD video camera 2 serving as the slave device is allowed to indirectly control the personal computer 4 serving as the master slave to write a moving image file DF or a still image file SF captured via the HDD video camera 2 on a DVD disk mounted on the DVD drive 37 of the personal computer 4, as described in detail below.

Figure 4:
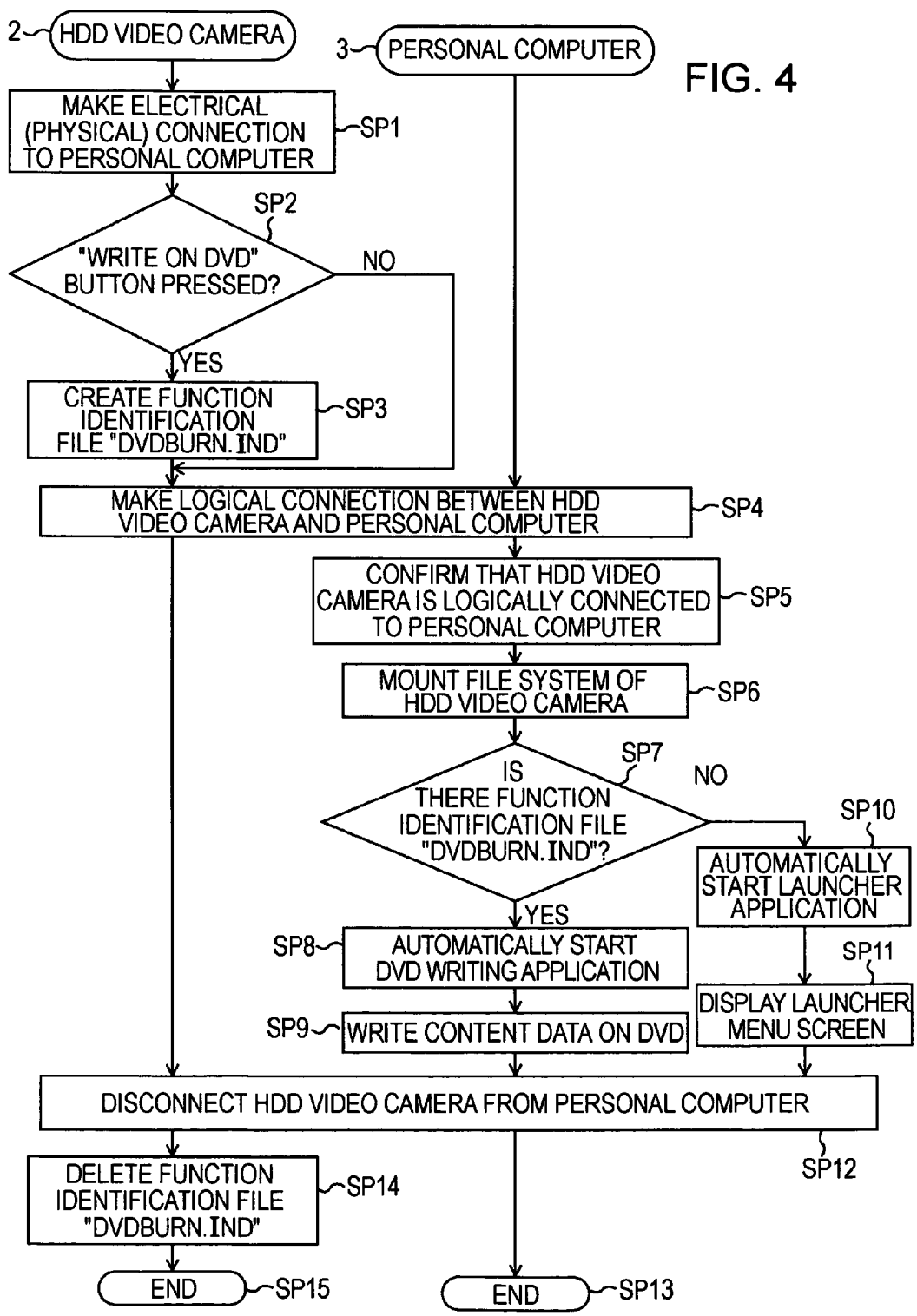
FIG. 4 is a flow chart showing a processing sequence of writing content data supplied from an HDD video camera on a DVD disk.
Figure 5:
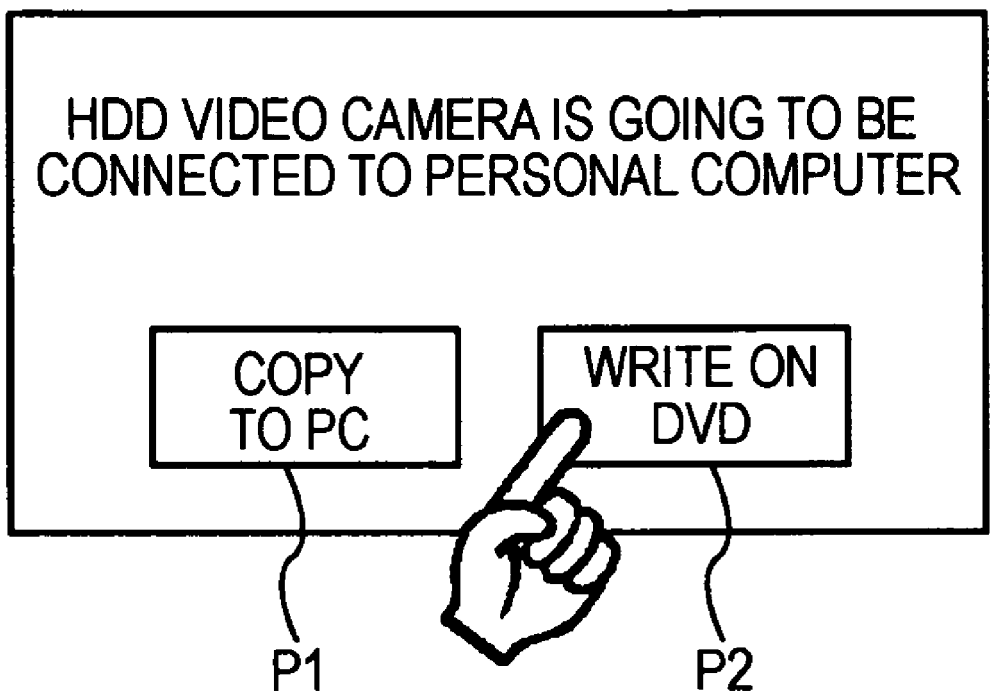
FIG. 5 is a schematic diagram showing a graphical user interface (GUI) screen of an HDD video camera.

As shown in FIG. 4, in step SP1 if the CPU 10 of the HDD video camera 2 determines that the HDD video camera 2 is electrically (physically) connected with the personal computer 4 via the USB cable 3, the CPU 10 of the HDD video camera 2 displays a pop-up window PW1 such as that shown in FIG. 5 on a LCD 19 (FIG. 2). Thereafter, the processing flow proceeds to a next step SP2.

In the present example, a text message "Camera is going to be connected to personal computer" is displayed in the pop-up window PW1 to indicate that although the HDD video camera 2 is electrically (physically) connected to the personal computer 4, the HDD video camera 2 is in a state in which the HDD video camera 2 is not yet logically connected to the personal computer 4, and thus the HDD video camera 2 is not yet set to operate as a slave device of the personal computer 4 and the HDD video camera 2 is allowed to operate independently of the personal computer 4.

In the pop-up window PW1, a "Copy to PC" button P1 and a "Write on DVD" button P2, which are operable in response to touching, are disposed in an area below the text message "Camera is going to be connected to personal computer". A user of the HDD video camera 2 is allowed to press one of these buttons to specify whether the moving image file DF or the still image file SF captured by the HDD video camera 2 is to be simply transferred to the personal computer 4 and stored therein, or the moving image file DF or the still image file SF is to be transferred to the personal computer 4 and written on a DVD disk.

In step SP2, the CPU 10 of the HDD video camera 2 determines whether the "Write on DVD" button P2 in the pop-up window PW1 has been touched by the user. If the answer to step SP2 is affirmative, the processing flow proceeds to step SP3.

In step SP3, in response to the touching of the "Write on DVD" button P2 by the user, the CPU 10 of the HDD video camera 2 creates a function identification file "DVDBURN.IND" to be read by the personal computer 4 and stores it on the hard disk drive 16. Thereafter, the processing flow proceeds to step SP4.

Figure 6:
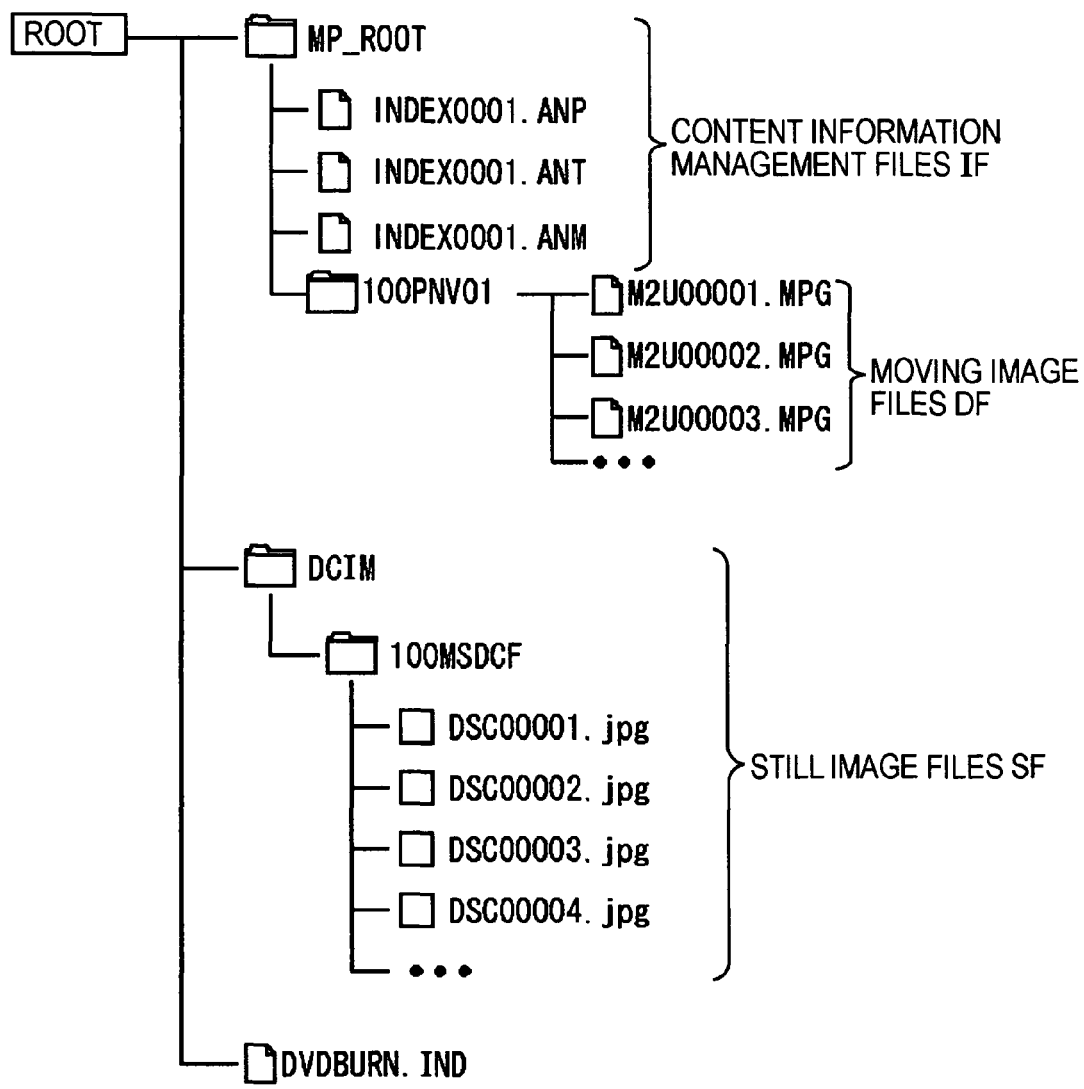
FIG. 6 is a schematic diagram showing a file system of an HDD video camera according to an embodiment of the present invention.

In step SP3 described above, the CPU 10 of the HDD video camera 2 creates the function identification file "DVDBURN.IND" and places it directly under a root directory of a file system FS1, that is, as shown in FIG. 6, the function identification file "DVDBURN.IND" is placed in parallel to a folder "MP_ROOT" and a folder "DCIM". In the specific example shown in FIG. 6, moving image files DF and content information management files IF (index files such as "INDEX0001.ANP", INDEX0001.ANT", and INDEX0001.ANM") are stored in the folder "MP_ROOT", and still image files SF ("DSC00001.JPG", DSC00002.JPG", DSC00003.JPG", etc.) are stored in the folder DCIM.

In the content information management file IF, for example, information necessary to manage content data, such as a play list, thumbnail images, meta data, etc., is described. Moving image data are stored as files with an extension of ".MPG" (such as "M2U00001.MPG", "M2U00002.MPG", "M2U00003.MPG", etc.) in a folder "100PNV01" located in the folder "MP_ROOT".

Because the function identification file "DVDBURN.IND" is placed directly under the root directory of the file system FS1 of the HDD video camera 2, the CPU 30 of the personal computer 4 can directly access the function identification file "DVDBURN.IND" from the root directory of the file system FS1 without having to go into a deep hierarchical level. This allows it to easily and quickly determine whether or not the function identification file "DVDBURN.IND" exists.

On the other hand, when the answer to step SP2 is negative, that is, when the "Write on DVD" button P2 is not touched by the user, the processing flow proceeds to step SP4 without producing the function identification file "DVDBURN.IND".

In step SP4, the CPU 10 of the HDD video camera 2 logically connects the HDD video camera 2 to the personal computer 4 such that the personal computer 4 serves as a master device and the HDD video camera 2 serves as a slave device. The processing flow then proceeds to step SP5.

If the CPU 30 of the personal computer 4 detects in step SP5 that the HDD video camera 2 is logically connected to the personal computer 4, then the processing flow proceeds to step SP6.

In step SP6, the CPU 30 of the personal computer 4 mounts a file system FS1 of the HDD video camera 2 from the HDD video camera 2 connected to the personal computer 4 via the USB cable 3. The processing flow then proceeds to step SP7.

In step SP7, the CPU 30 of the personal computer 4 checks the file system FS1 of the HDD video camera 2 to determine whether the file system FS1 includes the function identification file "DVDBURN.IND". If the answer to step SP7 is affirmative, the processing flow proceeds to step SP8.

In step SP8, because the CPU 30 of the personal computer 4 has detected in the previous step that the file system FS1 of the HDD video camera 2 includes the function identification file "DVDBURN.IND", the CPU 30 of the personal computer 4 automatically starts a DVD writing program stored on the hard disk drive 34 in accordance with an information processing apparatus control program resident in a RAM 22. The processing flow then proceeds to step SP9.

In step SP9, the CPU 30 of the personal computer 4 requests the HDD video camera 2 to transfer the moving image file DF or the still image file SF according to the DVD writing program. In response to the request, the HDD video camera 2 transmits the moving image file DF or the still image file SF to the personal computer 4. In the personal computer 4, the received moving image file DF or the still image file SF is recorded on a DVD disk using the DVD drive 37. Thereafter, the processing flow proceeds to step SP12.

In step SP12, because the DVD writing process corresponding to the "Write on DVD" button P2 has been completed, the CPU 10 of the HDD video camera 2 and the CPU 30 of the personal computer 4 release the logical connection between the HDD video camera 2 and the personal computer 4. As a result, the state is released in which the personal computer 4 operates as the master device and the HDD video camera 2 serves as the slave device. The CPU 30 of the personal computer 4 advances the process to step SP13, while the CPU 10 of the HDD video camera 2 advances the process to step SP14.

In step SP14, because the logical connection with the personal computer 4 has been released and thus the master-slave relationship has been released in the previous step, the CPU 10 of the HDD video camera 2 deletes the function identification file "DVDBURN.IND" from the file system FS1. The processing flow proceeds to step SP15. In step SP15, the whole process is ended. Note that steps SP12 and SP14 do not necessarily be executed, but these steps may be executed as required.

In a case in which the answer to step SP7 is negative, that is, in a case in which the file system FS1 of the HDD video camera 2 does not include the function identification file "DVDBURN.IND", it is not necessary to start the DVD writing program, and thus the CPU 30 of the personal computer 4 advances the process to step SP10.

In step SP10, because the file system FS1 of HDD video camera 2 does not include the function identification file "DVDBURN.IND", the CPU 30 of the personal computer 4 automatically starts a default launcher application program according to the information processing apparatus control program. The processing flow then proceeds to step SP1.

Figure 7:
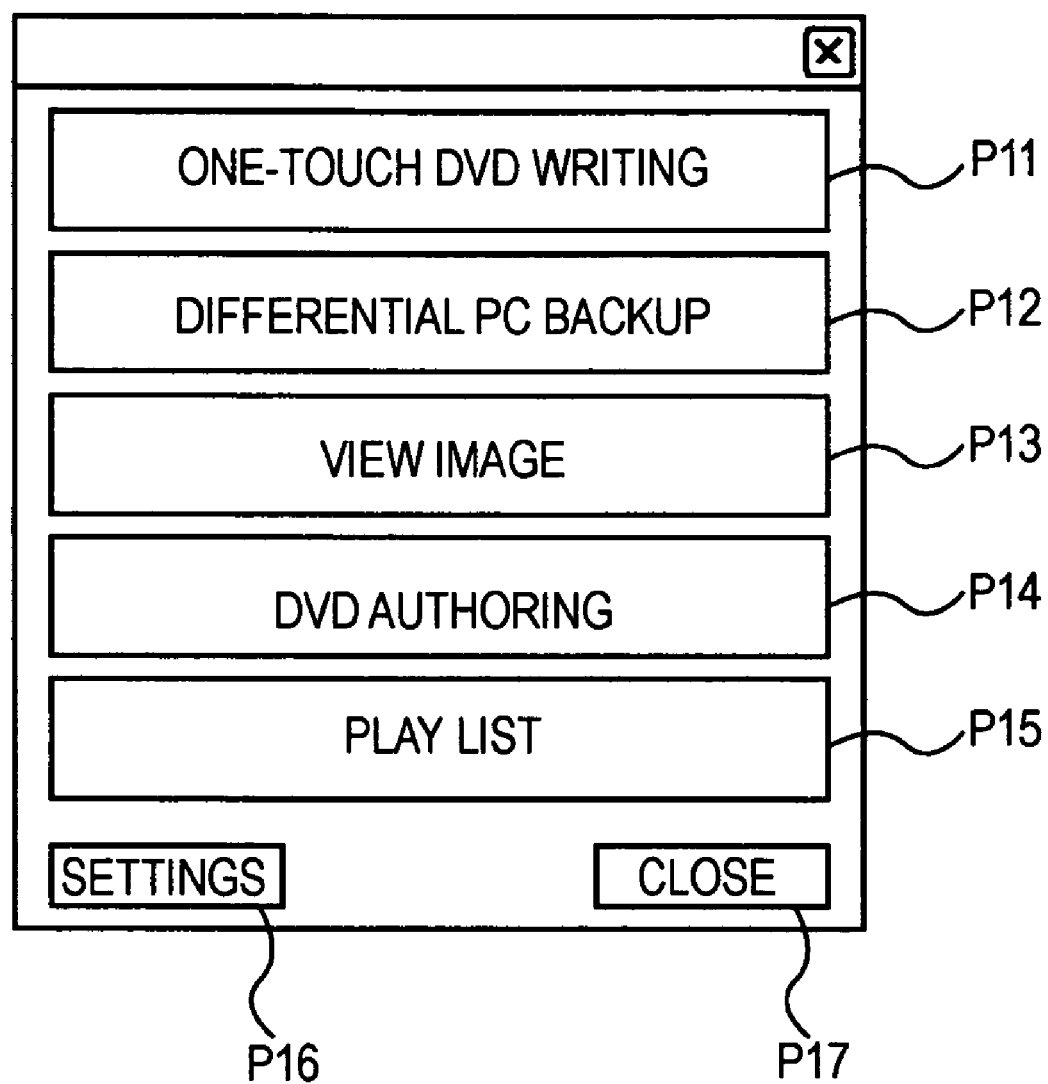
FIG. 7 is a schematic diagram showing a launcher menu screen according to an embodiment of the present invention.

In step SP11, according to the launcher application program, the CPU 30 of the personal computer 4 displays a launcher menu screen LMG1 such as that shown in FIG. 7 on the monitor 36.

On the launcher menu screen LMG1, there are provided a "One-Touch DVD Writing" button P11, a "Differential PC Backup" button P12, a "View Image" button P13, a "DVD Authoring" button P14, a "Play List" button P15, a "Settings" button P16, and a "Close" button P17.

If the "One-Touch DVD Writing" button P11 is pressed by a user, the CPU 30 of the personal computer 4 automatically starts the DVD writing program to write a moving image file DF or a still image file SF supplied from the HDD video camera 2 on a DVD disk via the DVD drive 37. That is, when the "One-Touch DVD Writing" button P11 is pressed, a process is performed in a similar manner to the process performed in response to pressing of the "Write on DVD" button P2 provided in the pop-up window PW1 of the HDD video camera 2.

In this process, the CPU 30 of the personal computer 4 determines whether there is a moving image file DF or a still image file SF supplied from the HDD video camera which is not yet recorded on the DVD disk, and records detected unrecorded moving image file DF or still image file SF on the DVD disk. In a case in which no new moving image file DF or a still image file SF to be recorded is found, an error message is displayed to inform the user of that there is no file to be recorded.

When the "Differential PC Backup" button P12 is pressed, if the HDD video camera 2 has a moving image file DF or still image file SF which has not been captured by the personal computer 4, only such an image file is stored on the hard disk drive 34 of the personal computer 4. When there is no difference between the image files stored in the HDD video camera 2 and the image files stored in the personal computer 4, an error message is displayed to inform a user of this fact.

The "View Image" button P13 is used to display a specified moving or still image using a particular browser. More specifically, when the "View Image" button P13 is pressed, the CPU 30 of the personal computer 4 displays an image according to a moving image file DF or a still image file SF captured via the HDD video camera 2 or according to a video file downloaded from a site on the Internet.

When the "DVD Authoring" button P14 is pressed by a user, the user is allowed to edit a moving image file DF or a still image file SF to be recorded on a DVD disk using the DVD writing program. More specifically, for example, the user is allowed to select parts, which are to be recorded, from the moving image file DF or the still image file SF. That is, this button allows the user to write, on a DVD disk, the moving image file DF or the still image file SF stored in the HDD video camera 2 not directly but after editing the image file.

The "Play List" button P15 is used to record moving image files DF and/or still image files SF in the order specified by a play list stored in the HDD video camera 2. When the HDD video camera 2 has a play list, still image files SF compressed according to the JPEG standard are converted into a form according to the MPEG2 standard and the resultant image files are recorded in the same manner as the manner in which moving image files DF are recorded. However, when the HDD video camera 2 has no play list, still image files SF according to the JPEG standard are directly recorded without being converted.

That is, in this mode in which moving images file DF and still image files SF are recorded in accordance with the play list, the CPU 30 of the personal computer 4 converts the JPEG still image files SF according to the same MPEG2 format as that for the moving image files DF, and thus the still image files SF recorded on the DVD disk can be played back using a DVD player capable of handling only MPEG2 files.

The "Settings" button P16 allows a user to change detailed settings associated with conditions under which to record the moving image file DF or the still image file SF on a DVD disk. The "Close" button P17 is used to close the launcher menu screen LMG1.

Operation and Advantages of the First Embodiment

In the information processing system 1 configured in the above-described manner according to the first embodiment, when the "Write on DVD" button P2 in the pop-up window PW1 displayed on the LCD 19 of the HDD video camera 2 is touched by a user, the function indemnification file "DVD-BURN.IND" is created and stored on the hard disk drive 16. When the HDD video camera 2 is logically connected to the personal computer 4, if the personal computer 4 detects this function identification file "DVDBURN.IND" of the HDD video camera 2, the personal computer 4 automatically starts the DVD writing program in accordance with the information processing apparatus control program, reads the moving image file DF and/or the still image file SF stored in the HDD video camera 2, and writes the moving image file DF and/or the still image file SF on a DVD disk.

Thus, in the state in which the HDD video camera 2 is logically connected to the personal computer 4 such that the HDD video camera 2 operates as a slave device and the personal computer 4 operates as a master device and thus the HDD video camera 2 operating as the slave device is not allowed to directly issue a write-on-DVD command to the personal computer 4, use of the function identification file "DVDBURN.IND" makes it possible for the HDD video camera 2 to indirectly control the personal computer 4 to record content data on a DVD disk. That is, the same effect as that achieved by directly issuing the write-on-DVD command to the personal computer 4 can be achieved indirectly.

Thus, the user of the HDD video camera 2 is allowed to transfer the moving image file DF and/or the still image file SF to the personal computer 4 and write them on a DVD disk simply by touching the "Write on DVD" button P2 without having to operate the personal computer 4 or install a special driver software program on the personal computer 4.

When the function identification file "DVDBURN.IND" is not found in the file system FS1 of the HDD video camera 2, the CPU 30 of the personal computer 4 displays the launcher menu screen LMG1 on the monitor 36. This provides an effect equivalent to that of supplying a command to display the launcher menu screen LMG1 from the HDD video camera 2 to the personal computer 4.

When the "One-Touch DVD Writing" button P11 on the launcher menu screen LMG1 is pressed, the CPU 30 of the personal computer 4 also reads the moving image file DF and/or the still image file SF from the HDD video camera 2 and records them on a DVD disk. That is, in the information processing system 1, it is allowed to write image files on a DVD disk by operating either the video camera 2 or the personal computer 4, and thus a great improvement in usability can be achieved.

In the information processing system 1, as described above, even in the state in which the personal computer 4 is set to serve as a master device and the HDD video camera 2 is set to serve as a slave device after they have been connected to each other. it is allowed to transfer a moving image file DF and/or a still image file SF from the HDD video camera 2 to the personal computer 4 and write them on a DVD disk simply by touching a button on the HDD video camera 2.

Second Embodiment

General Configuration of Information Processing System

Figure 8:
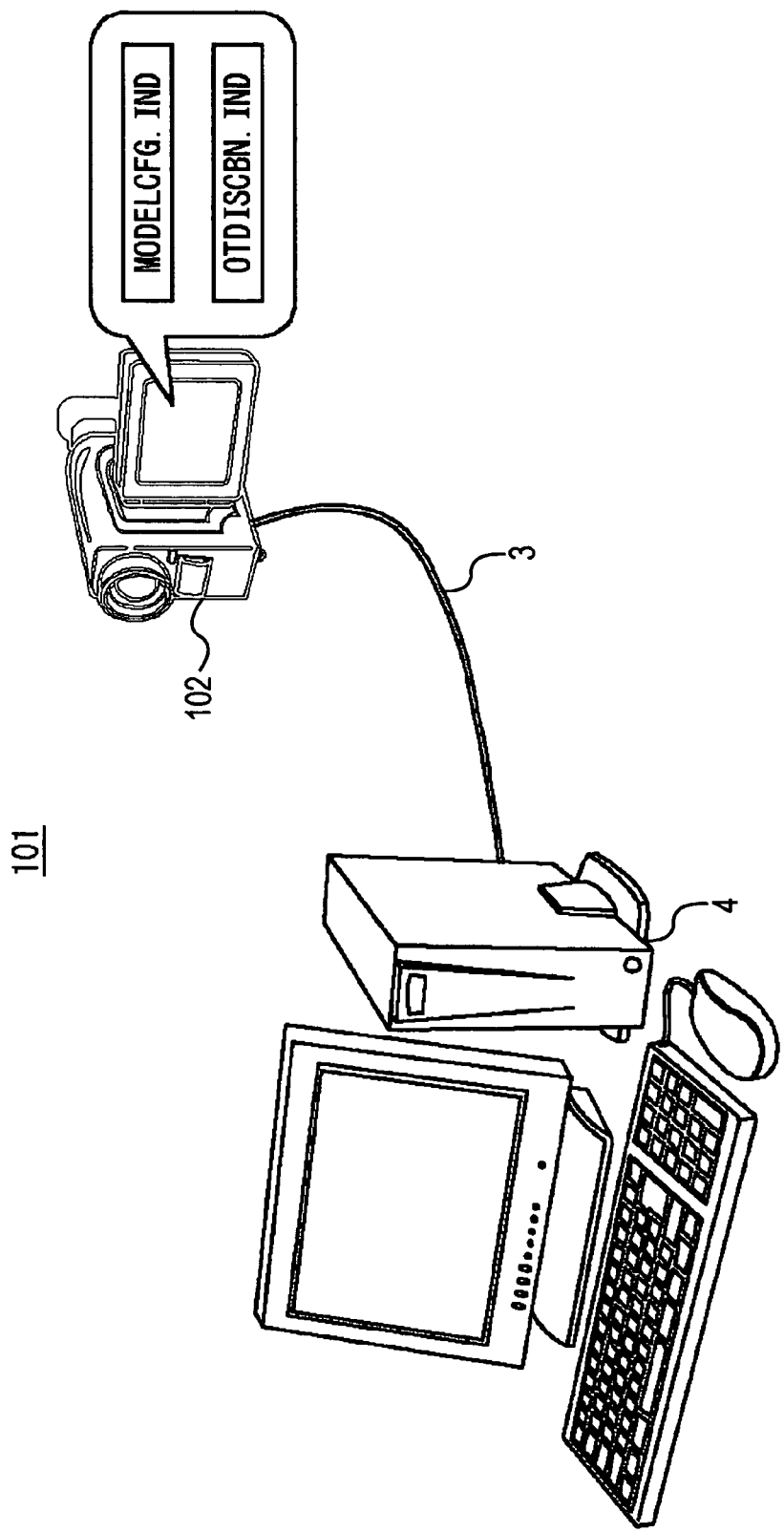
FIG. 8 is a perspective view schematically showing a general configuration of an information processing system according to an embodiment of the present invention.

In FIG. 8, similar parts to those in FIG. 1 are denoted by similar reference numerals. As shown in FIG. 8, an information processing system 101 according to a second embodiment of the present invention includes an HDD video camera 102 capable of taking a moving image according to the SD (Standard Definition) or HD (High Definition) standard, and a personal computer 4 connected to the HDD video camera 102 via a communication interface such as a USB cable 3.

When the SD recording mode is selected, the HDD video camera 102 is capable of creating a moving image file according to the SD standard (hereinafter, simply referred to as an SD moving image file) and storing the created SD moving image file in a hard disk drive disposed in the HDD video camera 102. On the other hand, in the HD recording mode, the HDD video camera 102 is capable of storing a moving image file according to the HD standard (hereinafter referred to simply as an HD moving image file) in the hard disk drive disposed in the HDD video camera 102.

When the HDD video camera 102 is connected to the personal computer 4 via the USB cable 3, the personal computer 4 sets itself to serve as a master device and treats the HDD video camera 102 as a simple storage device. According to an application program installed on the personal computer 4, the personal computer 4 is capable of reading an SD moving image file or an HD moving image file from the HDD video camera 102 and saving the read image file in the personal computer 4. The personal computer 4 is also capable of printing an image according to the SD moving image file or the HD moving image file stored in the HDD video camera 102.

That is, in the state in which the HDD video camera 102 is connected to the personal computer 4 via the USB cable 3, the personal computer 4 serves as the master device and the HDD video camera 102 serves as the slave device, and the HDD video camera 102 is not allowed to directly control the personal computer 4.

However, in the information processing system 101 according to the present embodiment of the invention, the HDD video camera 102 serving as the slave device creates a function identification file "OTDISCBN.IND" similar to the function identification file "DVDBURN.IND", which makes it possible for the HDD video camera 102 to indirectly control the personal computer 4 via the function identification file "DVDBURN.IND" such that the personal computer 4 operates according to the function identification file "DVD-BURN.IND".

Furthermore, in the information processing system 101, when the SD moving image file or the HD moving image file read from the HDD video camera 102 serving as the slave device is stored on a recording medium by the personal computer 4, a user is allowed to specify, by touching one of one-touch operation buttons, whether the SD moving image file or the HD moving image file is to be stored or both the SD moving image file and the HD moving image file are to be stored.

In response to the selection made by the user, the HDD video camera 102 generates a camera identification file "MODELCFG.IND" in which the type of content to be recorded is described, that is, information is described to indicate whether the file specified to be recorded is the SD moving image file or the HD moving image file or both the SD moving image file and the HD moving image file are specified to be recorded. This camera identification file "MODELCFG.IND" is read by the personal computer 4 and the personal computer 4 performs a recording operation according to the camera identification file "MODELCFG.IND".

More specifically, in a case in which the CPU 30 of the personal computer 4 detects that the type information described in the camera identification file "MODELCFG.IND" stored in the HDD video camera 102 indicates that the HD moving image file type has been specified as the type of a file to be recorded, the CPU 30 of the personal computer 4 extracts only HD moving image files from the HDD video camera 102 and records the extracted HD moving image files on a Blu-ray disk in a recordable format.

On the other hand, when the CPU 30 of the personal computer 4 detects that the type information described in the camera identification file "MODELCFG.IND" stored in the HDD video camera 102 indicates that the SD moving image file type has been specified as the type of a file to be recorded, the CPU 30 of the personal computer 4 extracts only SD moving image files from the HDD video camera 102 and records the extracted HD moving image files on a DVD disk in a format suitable for recording the SD moving image files.

In a case in which the CPU 30 of the personal computer 4 detects that the type information described in the camera identification file "MODELCFG.IND" stored in the HDD video camera 102 indicates that both the HD moving image file and the SD moving image file are specified to be recorded, the CPU 30 of the personal computer 4 first extracts HD moving image files from the HDD video camera 102 and records them on a Blu-ray disk and then extracts SD moving image files from the HDD video camera 102 and records them on a DVD disk which is mounted after the Blu-ray disk is removed.

Note that the HDD video camera 102 serving as the slave device may record a SD moving image file or a JPEG (Joint Photographic Experts Group) still image on either a DVD disk or a Blu-ray disk as required.

In the information processing apparatus 101, as described above, the HDD video camera 102 is connected to the personal computer 4 via a cable communication interface such as the USB cable 3. However, the connection does not necessarily need to be realized using a cable but the connection may be realized using a wireless communication interface such as a Bluetooth module (trademark) or IEEE802.11g wireless communication interface.

Circuit Configuration of the HDD Video Camera

Figure 9:
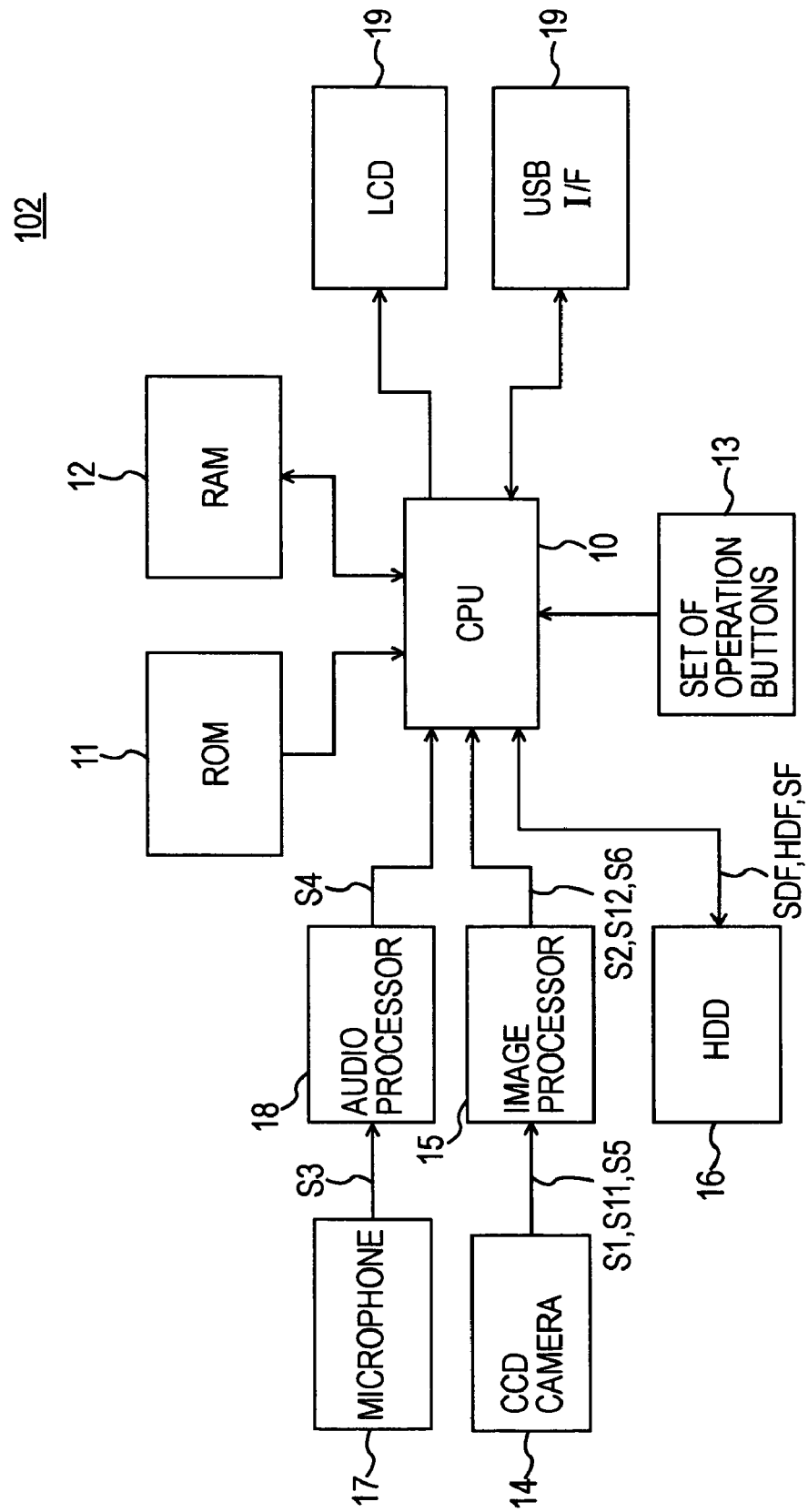
FIG. 9 is a schematic block diagram showing a circuit configuration of an HDD video camera according to an embodiment of the present invention.

In FIG. 9, similar parts to those in FIG. 2 are denoted by similar reference numerals. As shown in FIG. 9, the HDD video camera 102 is similar in circuit configuration to the above-described HDD video camera 2 according to the first embodiment. The HDD video camera 102 operates with electric power supplied by a battery (not shown). The CPU 10 loads a basic program and various kinds of application programs from a ROM 11 into a RAM 12 and controls the whole HDD video camera 102 in accordance with the basic program and various kinds of application programs loaded in the RAM 12. In response to pressing of one of a set of operation buttons 13 by a user, the CPU 10 performs various processes such as capturing of an image, a playback process, an editing process, etc. depending on which one of the set of buttons is pressed.

More specifically, for example, when an image of a subject specified by a user is taken, in response to pressing of particular one of the set of buttons 13, under the control of the CPU 10 of the HDD video camera 102, it is allowed to select either the SD recording mode or the HD recording mode. Image data S1 taken by the CCD camera 14 in the SD recording mode or image data S11 in the HD recording mode is subjected to image processing performed by the image processor 15. As a result, SD image data S2 or HD image data S12 is obtained.

Concurrently, the CPU 10 of the HDD video camera 102 converts audio data S3 detected by the microphone 17 into audio data S4 by performing audio processing using the audio processor 18.

When the operation in the SD recording mode, the CPU 10 of the HDD video camera 102 produces an SD moving image file SDF including SD image data S2 and associated audio data S4 and stores the resultant SD moving image file SDF in the hard disk drive 16. On the other hand, when the operation is in the HD recording mode, the CPU 10 of the HDD video camera 102 produces an HD moving image file HDF including HD image data S12 and associated audio data S4 and stores the resultant HD moving image file HDF in the hard disk drive 16.

Figure 10:
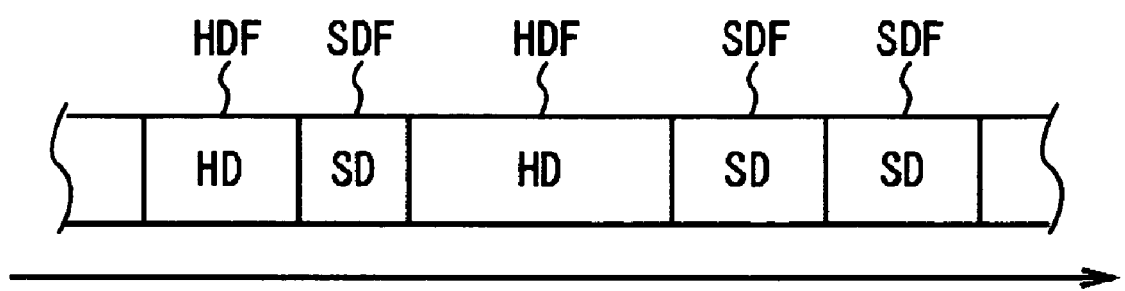
FIG. 10 is a schematic diagram showing a various kinds contents recorded on an HDD.

Thus, in the HDD video camera 102, as shown in FIG. 10, a mixture of HD moving image files HDF and SD moving image files SDF is stored on a hard disk by the hard disk drive 16.

When still image data S5 is captured by the CCD camera 14, the CPU 10 of the HDD video camera 102 converts the still image data S5 into still image data S6 by performing image processing using the image processor 15 and stores the result as a still image file SF in the hard disk drive 16.

When a user presses a particular one of the set of operation buttons 13 to select a particular SD moving file SDF, an HD moving image file HDF, or a still image file SF, the CPU 10 of the HDD video camera 102 reads the selected image file from the hard disk drive 16 and displays a moving image or a still image on an LCD (Liquid Crystal Display) 19 according to the read SD moving image file SDF, the HD moving image file HDF, or the still image file SF.

The CPU 10 of the HDD video camera 102 is connected to the personal computer 4 via the USB interface 20 and the USB cable 3 (FIG. 8) so that the SD moving image file SDF, the HD moving image file HDF, or the still image file SF can be transferred from the HDD video camera 102 to the personal computer 4 and saved therein, or the SD moving image file SDF, the HD moving image file HDF, or the still image file SF is transferred from the HDD video camera 102 and recorded on a removable recording medium such as a DVD disk or a Blu-ray disk via the personal computer 4.

The recording media on which to record the SD moving image file SDF, the HD moving image file HDF, or the still image file SF are not limited to the DVD disk and the Blu-ray disk, but other types of recording media such as a HD (High Definition)-DVD disk, a CD-R (Compact Disc-Recordable) disk, or a flash memory may also be used.

Circuit Configuration of the Personal Computer

In the second embodiment, the personal computer 4 in the information processing system 101 is similar in circuit configuration to the personal computer 4 according to the first embodiment described above with reference to FIG. 3, and thus a duplicated explanation thereof is omitted here.

Processing Sequence of Writing Data on Disk Depending on the Type of Content Supplied from HDD Video Camera In the present embodiment, in the state in which the HDD video camera 102 is connected to the personal computer 4 in the information processing system 101 via the USB cable 3, the HDD video camera 102 set to operate as the slave device is allowed to indirectly control the personal computer 4 serving as the master device such that an SD moving image file SDF or an HD moving image file HDF is transmitted from the HDD video camera 102 to the personal computer 4 and is recorded on a DVD disk or a Blu-ray disk, depending on the type of the image file supplied from the HDD video camera 102, using the DVD drive 37 of the personal computer 4. In this processing sequence, a preprocessing is first performed by the HDD video camera 102 as described below with reference to FIG. 11.

Pre-processing Performed by HDD Video Camera

Figure 11:
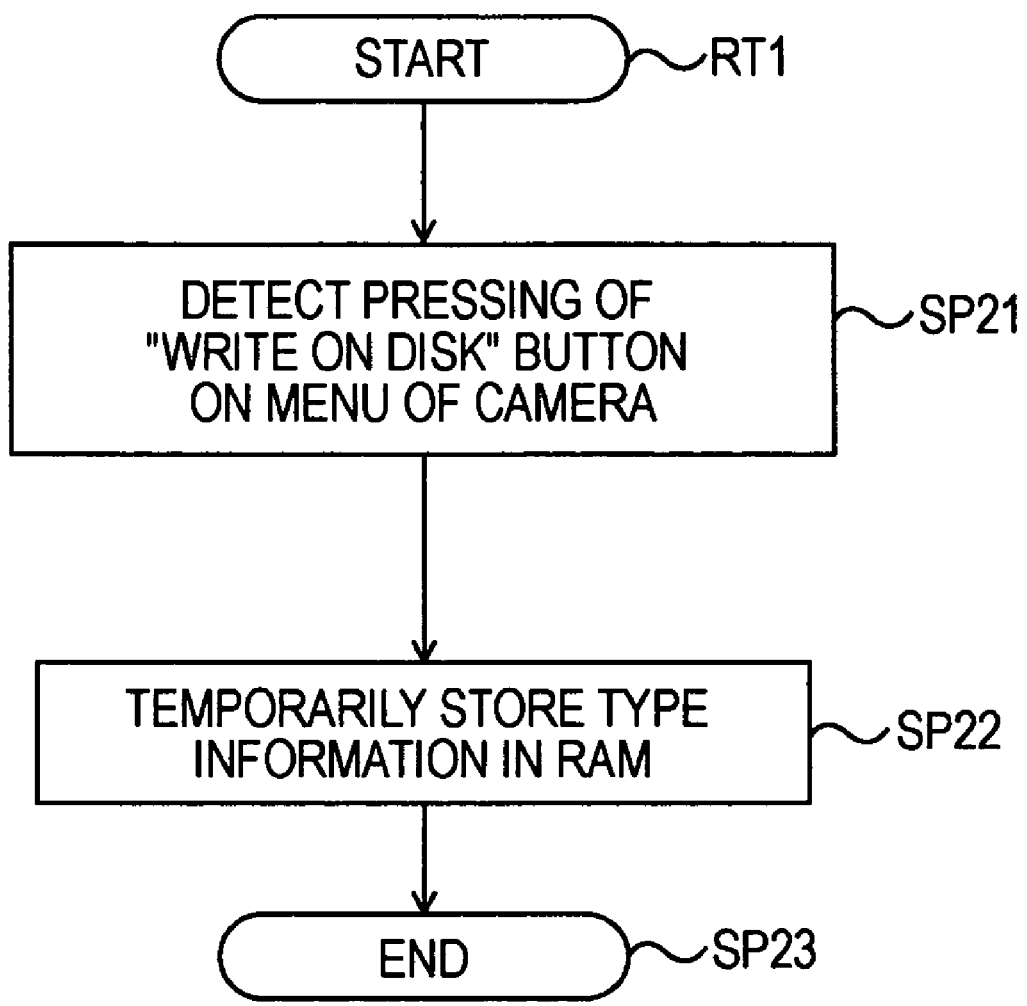
FIG. 11 is a flow chart showing a pre-process performed by an HDD video camera according to an embodiment of the present invention.
Figure 12:
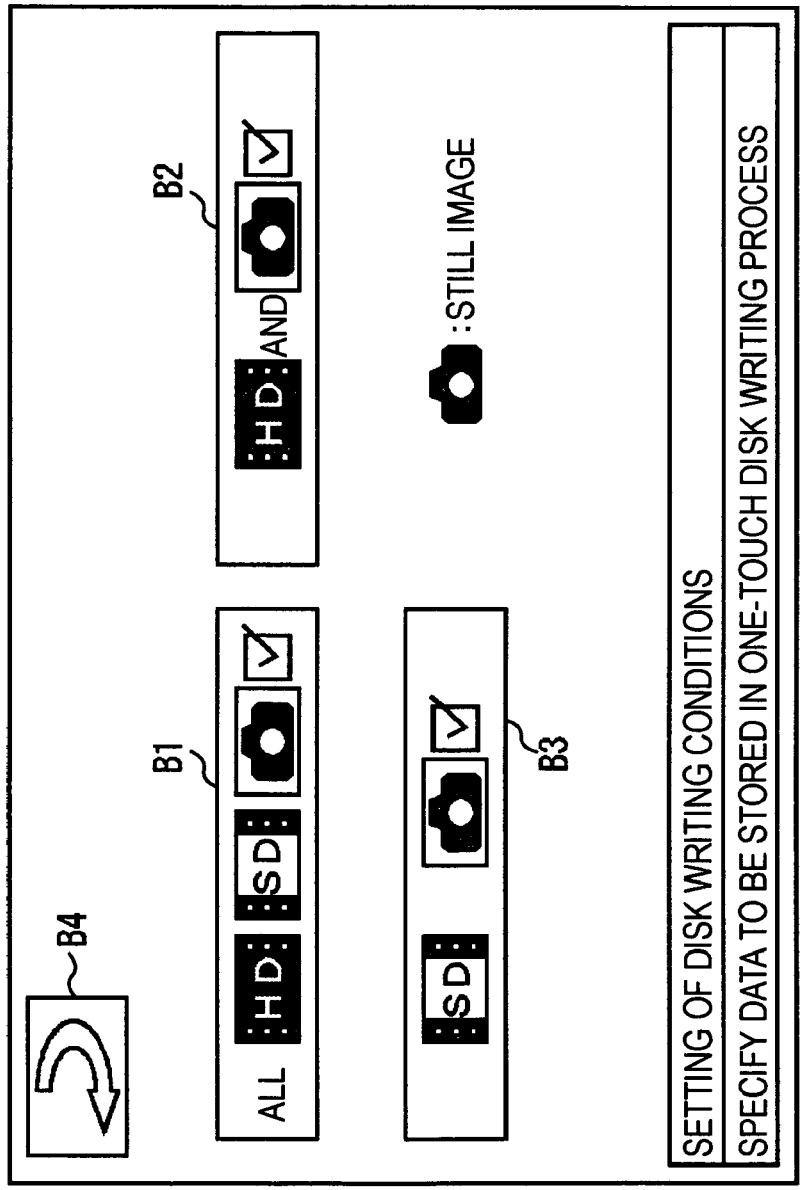
FIG. 12 is a schematic diagram showing a content type selection screen.

If the CPU 10 of the HDD video camera 102 has started a pre-processing routine at RT1 in FIG. 11, the CPU 10 advances the processing flow to step SP21. In step SP21, if pressing on a "Write on Disk" button (not shown) in an OSD (On Screen Display) menu displayed on the LCD 19 is detected, a content type selection screen SG such as that shown in FIG. 12 for allowing setting of disk writing conditions is displayed on the LCD 19. The processing flow then proceeds to step SP22.

In this content type selection screen SG, a message "Select Content Type To Be Written Using One-Touch Button" is displayed in a lower area, and an "All" button B1, an "HD" button B2, and an "SD" button B3 are disposed in a central area. The "All" button B1 is used to select all image files including SD moving image files SDF, HD moving image files HDF, and still image files SF stored in the HDD video camera 102 as image files to be written on a recording medium by the personal computer 4. The "HD" button B2 is used to select HD moving image files HDF and still image files SF as image files to be written on a recording medium by the personal computer 4. The "SD" button B3 is used to select SD moving image files SDF and still image files SF as image files to be written on a recording medium by the personal computer. The content type selection screen SG also has a "Back" button B4.

The "All" button B1, the "HD" button B2, and the "SD" button B3 each have a check box disposed to the right of an icon representing a still image file SF. When this check box is unchecked, still image files SF are not written on a recording medium.

In step SP22, if the "All" button B2 in the content type selection screen SG is selected by a user, the CPU 10 of the HDD video camera 102 describes type information so as to indicate that all image files including SD moving image files SDF, HD moving image files HDF, and still image files SF are specified as image files to be written on a recording medium, and the CPU 10 temporarily stores the type information in the RAM 12. In a case in which the "HD" button B2 is selected by a user, the CPU 10 of the HDD video camera 102 describes the type information so as to indicate that HD moving image files HDF and still image files SF are specified as image files to be written and the CPU 10 temporarily stores the type information in the RAM 12. On the other hand, when the "SD" button B3 is selected by a user, the CPU 10 of the HDD video camera 102 describes the type information so as to indicate that SD moving image files SDF and still image files SF are specified as image files to be written and the CPU 10 temporarily stores the type information in the RAM 12. The processing flow then proceeds to step SP23 and the pre-processing is ended.

Processing Sequence of Writing Data on Disk Depending on the Type of Content

After the completion of the pre-processing described above, if the HDD video camera 102 of the information processing system 101 is connected to the personal computer 4 via the USB cable 3, it becomes possible for the HDD video camera 102 serving as a slave device to indirectly control the personal computer 4 serving as a master device such that a specified combination of SD moving image files SDF, HD moving image files HDF and/or still image files SF stored in the HDD video camera 102 is recorded on a DVD disk or a Blu-ray disk by the DVD drive 37 of the personal computer 4, depending on the types of contents included in the specified combination of image files, as described in detail below.

Figure 13:
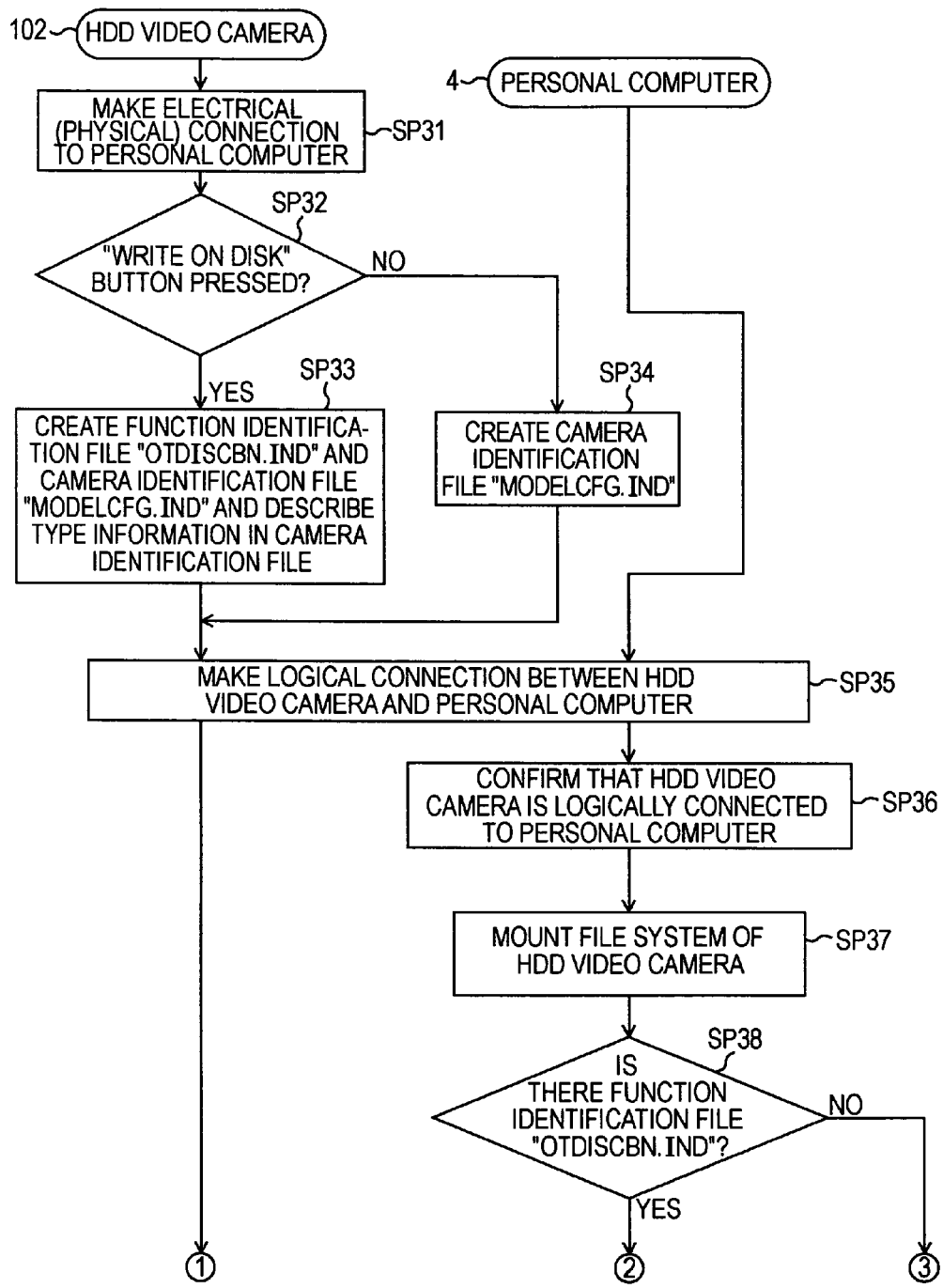
FIG. 13 is a flow chart showing a part of a processing sequence of writing content data supplied from an HDD video camera in an optimum manner depending on the content type according to an embodiment of the present invention.
Figure 14:
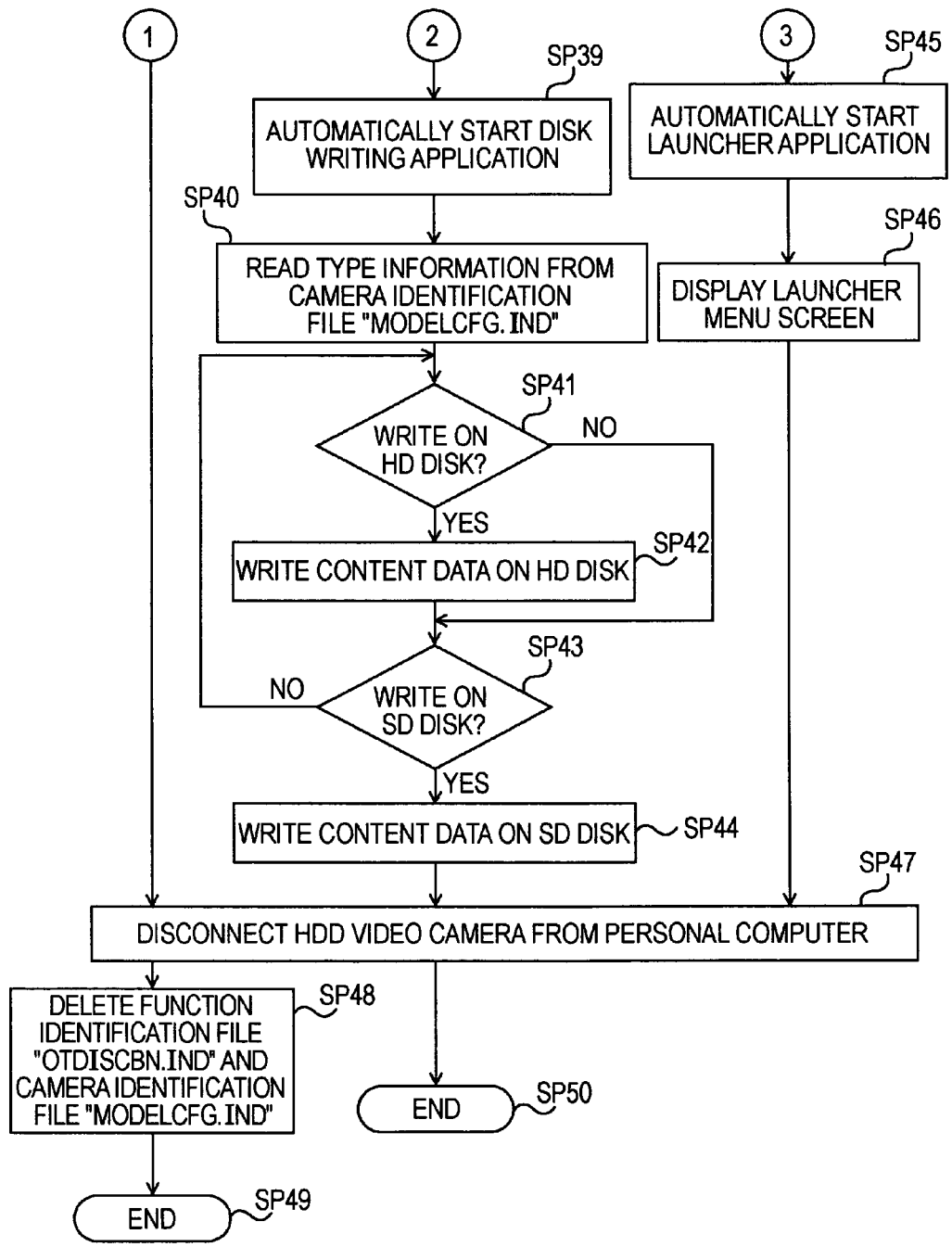
FIG. 14 is a flow chart showing a following part of the processing sequence of writing content data supplied from an HDD video camera in an optimum manner depending on the content type according to an embodiment of the present invention.
Figures 15, 16:
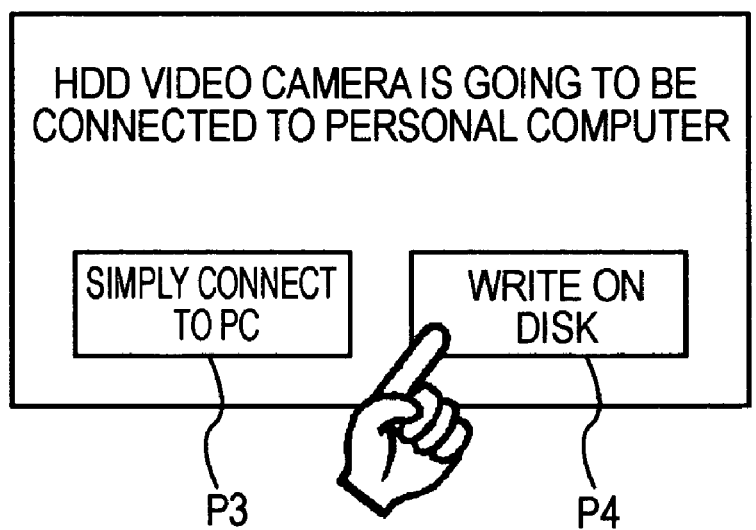
FIG. 15 is a schematic diagram showing a graphical user interface (GUI) screen of an HDD video camera.
FIG. 16 is a schematic diagram showing an example of content of a camera identification file.

As shown in FIG. 13 and FIG. 14, in step SP31, if the CPU 10 of the HDD video camera 102 detects that the HDD video camera 102 is electrically (physically) connected with the personal computer 4 via the USB cable 3, displays a pop-up window PW2 such as that shown in FIG. 15 on the LCD 19 (FIG. 9). Thereafter, the processing flow proceeds to a next step SP32.

In the present example, a text message "Camera is going to be connected to personal computer" is displayed in the pop-up window PW2 to indicate that although the HDD video camera 102 is electrically (physically) connected to the personal computer 4, the HDD video camera 102 is in a state in which the HDD video camera 102 is not yet logically connected to the personal computer 4, and thus the HDD video camera 102 is not yet set to operate as a slave device of the personal computer 4 and the HDD video camera 102 is allowed to operate independently of the personal computer 4.

In the pop-up window PW2, a "Simply Connect to PC" button P3 and a "Write on Disk" button P4, which are operable in response to touching, are disposed in an area below the text message "Camera is going to be connected to personal computer".

When the "Simply Connect to PC" button P3 is selected by a user of the HDD video camera 102, a SD moving image file SDF, an HD moving image file HDF, and/or a still image file SF taken by the HDD video camera 102 are transferred to the personal computer 4 and stored therein. When the "Write on Disk" button P4 is selected, the SD moving image file SDF, the HD moving image file HDF, and/or the still image file SF are transferred to the personal computer 4 and recorded on a recording medium such as a DVD disk or a Blu-ray disk.

In step SP32 the CPU 10 of the HDD video camera 102 determines whether the "Write on Disk" button P4 in the pop-up window PW2 has been touched by the user. If the answer to step SP32 is affirmative, the processing flow proceeds to step SP33.

In step SP33, in response to the detection, in step SP32, of touching to the "Write on Disk" button P4 by the user, the CPU 10 of the HDD video camera 102 creates a function identification file "OTDISCBN.IND" for causing the personal computer 4 to start the disk writing program and a camera identification file "MODELCFG.IND" in which the type information produced in the pre-processing described above and temporarily stored in the RAM 12 is described, and the CPU 10 of the HDD video camera 102 stores these two files in the hard disk drive 16. Thereafter, the processing flow proceeds to step SP34.

As shown in FIG. 16, the camera identification file "MODELCFG.IND" described above includes manufacturer information (in one byte) indicating an ID (identification) uniquely assigned to a camera manufacturer described in a filed area, model number information (in one byte indicating a model number uniquely assigned to the HDD video camera 102 described in a model name area, attribute information associated with the HDD video camera 102, and the type information described in a one-touch button selection area and indicating which one of buttons (the "All" button B1, the "HD" button B2, and the "SD" button B3) on the content type selection screen SG has been selected by a user.

Figure 17:
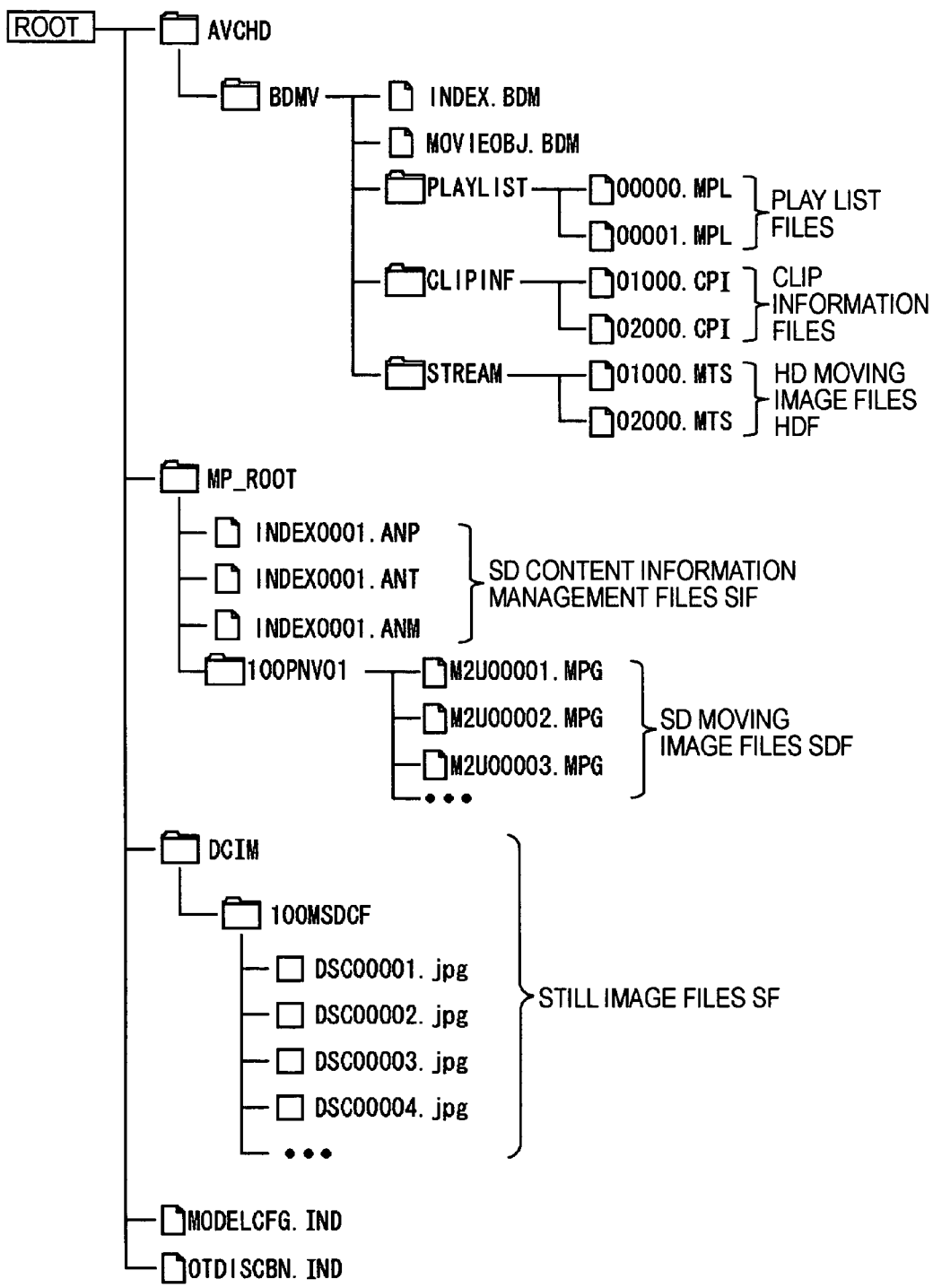
FIG. 17 is a schematic diagram showing a file system of an HDD video camera according to an embodiment of the present invention.

The CPU 10 of the HDD video camera 102 holds a file system FS2 in which the function identification file "OTDISCBN.IND" and the camera identification file "MODELCFG.IND" are disposed. As shown in FIG. 17, this file system FS2 is located direction below a root direction and in parallel to a "DCIM" folder in which an "AVCHD" folder in which various HD moving image content files are stored, an "MP_ROOT" folder in which various SD moving image content files are stored, and still image files ("DSC0001.JPG", "DSC00002.JPG", "DSC00003.JPG", etc.) are stored.

A "BDMV" folder for storing files associated with Blu-ray disks is formed under the "AVCHD" folder. In this "BDMV" folder, there are stored an index information file "INDEX.BDM" in which information associated with Blu-ray disk images is described, an attribute information file "MOVIEOBJ.BDM", play list files ("00000.MPL", "00001.MPL") clip information files ("01000.CPI", "02000.CPI"), and HD moving image files HDF ("01000.MTS", "02000.MTS").

In an "MP_ROOT" folder for storing various files of SD moving image contents, there are stored content information management files SIF ("INDEX0001.ANP", "INDEX0001.ANT", "INDEX0001.ANM") in which information needed to manage contents, such as a play list, thumbnail images, and meta data, and are described. In a "100PNV01" folder, SD moving image data are stored as SD moving image files SDF with an extension ".MPG" ("M2U00001.MPG", "M2U00002.MPG", "M2U00003.MPG", etc.).

Because the HDD video camera 102 stores the function identification file "OTDISCBN.IND" and the camera identification file "MODELCFG.IND" directly under the root directory, the CPU 30 of the personal computer 4 can directly access the file system FS2 to read the function identification file "OTDISCBN.IND" and the camera identification file "MODELCFG.IND" without having to go into a deep hierarchical level. This allows it to easily and quickly determine whether or not the function identification file "OTDISCBN.IND" exists and read the content of the camera identification file "MODELCFG.IND".

When the answer to step SP32 is negative, that is, when the "Write on Disk" button P4 is not touched by the user, the CPU 10 of the HDD video camera 102 advances the process to step SP34. In step SP34, the CPU 10 of the HDD video camera 102 creates the camera identification file "MODELCFG.IND" and advances the process to step SP35 without producing the function identification file "OTDISCBN.IND".

The step SP34 performed in the above-described manner is necessary because even in the case in which the "Write on Disk" button P4 is not pressed, it is necessary to request the personal computer 4 to treat the HDD video camera 102 not as a simple hard disk drive but as a video camera. Thus, when the HDD video camera 102 is connected to the personal computer 4, if the personal computer 4 detects the camera identification file "MODELCFG.IND", the personal computer 4 determines the type of the video camera in accordance with the camera identification file "MODELCFG.IND" and displays a launcher menu screen LMG2 (described later) corresponding to the type of the video camera.

In step SP35, the CPU 10 of the HDD video camera 102 logically connects the HDD video camera 102 to the personal computer 4. such that the personal computer 4 operates as a master device and the HDD video camera 102 operates as a slave device. The processing flow then proceeds to step SP36.

In step SP36, if the CPU 30 of the personal computer 4 detects that the HDD video camera 102 has been logically connected to the personal computer 4, then the processing flow proceeds to a next step SP37.

In step SP37, the CPU 30 of the personal computer 4 mounts a file system FS2 of the HDD video camera 102 from the HDD video camera 102 connected to the personal computer 4 via the USB cable 3. The processing flow then proceeds to step SP38.

In step SP38, the CPU 30 of the personal computer 4 checks the file system FS2 of the HDD video camera 102 to determine whether the file system FS2 includes the function identification file "OTDISCBN.IND". If the answer to step SP38 is affirmative, the processing flow proceeds to step SP39.

In step SP39, because the CPU 30 of the personal computer 4 has detected in the previous step that the file system FS2 of the HDD video camera 102 includes the function identification file "OTDISCBN.IND", the CPU 30 of the personal computer 4 automatically starts a DVD writing program stored in the hard disk drive 34 in accordance with an information processing apparatus control program resident in a RAM 22. Thereafter, the processing flow proceeds to step SP40.

In step SP40, the CPU 30 of the personal computer 4 reads the content type information described in the one-touch button setting area of the camera identification file "MODELCFG.IND" stored in the RAM 12 of the HDD video camera 102. The processing flow then proceeds to step SP41.

In step SP41, the CPU 30 of the personal computer 4 determines, from the content type information, which one of the image file types (the SD moving image files SDF or the HD moving image files HDF) of files stored in the HDD video camera 102 is specified as the image file type of files to be recorded, and the CPU 30 of the personal computer 4 further determines whether to record image files on a Blu-ray disk, which is a disk for recording HD moving image files HDF, according to the specified image file type.

More specifically, when the CPU 30 of the personal computer 4 determines that HD moving image files HDF are specified to be recorded, the CPU 30 determines that the files should be recorded on a Blu-ray disk, which is a disk of the most suitable type for recording HD moving image files. On the other hand, when SD moving image files SDF are specified to be recorded, the CPU 30 of the personal computer 4 determines that the files should be recorded on a DVD disk, which is disk of the most suitable type for recording SD moving image files.

In a case in which it is determined in step SP41 that the image file to be recorded is not of the HD moving image file HDF but of the SD moving image file SDF, the CPU 30 of the personal computer 4 advances the processing flow to step SP43.

On the other hand, when it is determined in step SP41 that the type of the image file to be recorded is the HD moving image file HDF, the CPU 30 of the personal computer 4 determines that the file should be recorded on a Blu-ray disk, and thus the CPU 30 of the personal computer 4 advances the process to step SP42.

In step SP42, according to the disk writing program, the CPU 30 of the personal computer 4 requests the HDD video camera 102 to transfer the HD moving image file HDF and the still image file SF. If the HD moving image file HDF and the still image file SF are transmitted to the personal computer 4 from the HDD video camera 2 in response to the request, the received HD moving image file HDF and the still image file SF are recorded on a Blu-ray disk using the DVD drive 27. The processing flow then proceeds to step SP43.

In step SP43, the CPU 30 of the personal computer 4 determines, on the basis of the content type information, whether the type of the image file to be recorded is the type of SD moving image file thereby determining whether the image file should be recorded on a DVD disk which is a disk of the most suitable type for recording SD moving image files SDF.

If the answer to step SP43 is negative, it is determined that the type of the file to be recorded is neither the HD moving image file HDF nor the SD moving image file SDF. In this case, the CPU 30 of the personal computer 4 returns the processing flow to step SP41 to re-determine the content type.

If the answer to step SP43 is affirmative, that is, if the type of the image file to be recorded is the SD moving image file SDF, it is determined that the image file should be recorded on a DVD disk. In this case, the processing flow proceeds to step SP44.

In step SP44, according to the disk writing program, the CPU 30 of the personal computer 4 requests the HDD video camera 102 to transfer the SD moving image file and the still image file SF, and records the SD moving image file and the still image file SF, transmitted from the HDD video camera 102 in response to the request, on a DVD disk in the DVD video format. The processing flow then proceeds to step SP47.

In step SP47, because the process of writing image files on a disk depending on the content type in response to pressing on the "Write on Disk" button P4 has been completed, the CPU 10 of the HDD video camera 102 and the CPU 30 of the personal computer 4 release the logical connection between the HDD video camera 102 and the personal computer 4. As a result, the state is released in which the personal computer 4 operates as the master device and the HDD video camera 102 serves as the slave device. The CPU 30 of the personal computer 4 advances the process to step SP50, while the CPU 10 of the HDD video camera 102 advances the process to step SP48.

If the logical connection between the personal computer 4 and the HDD video camera 102 has been released and the master-slave relation has been released, then in step SP48, the CPU 10 of the HDD video camera 102 deletes the function identification file "OTDISCBN.IND" and the camera identification file "MODELCFG.IND" from the file system FS2. The processing flow then proceeds to step SP49 to end the process. Note that steps SP47 and SP48 do not necessarily be executed, but these steps may be executed as required.

Thus, according to the present embodiment, when the HDD video camera 102 is connected to the personal computer 4 via the USB cable, recording is performed in a proper manner according to the intention of the user.

In a case in which the answer to step SP38 is negative, that is, when the file system FS2 of the HDD video camera 102 does not include the function identification file "OTDISCBN.IND", it is not necessary to start the disk writing program, and thus the CPU 30 of the personal computer 4 advances the process to step SP45.

In step SP45, because the file system FS2 of the. HDD video camera 102 does not include the function identification file "OTDISCBN.IND" but includes only the camera identification file "MODELCFG.IND", the CPU 30 of the personal computer 4 starts the default launcher application program according to the information processing apparatus control program. The processing flow then proceeds to step SP46.

Figure 18:
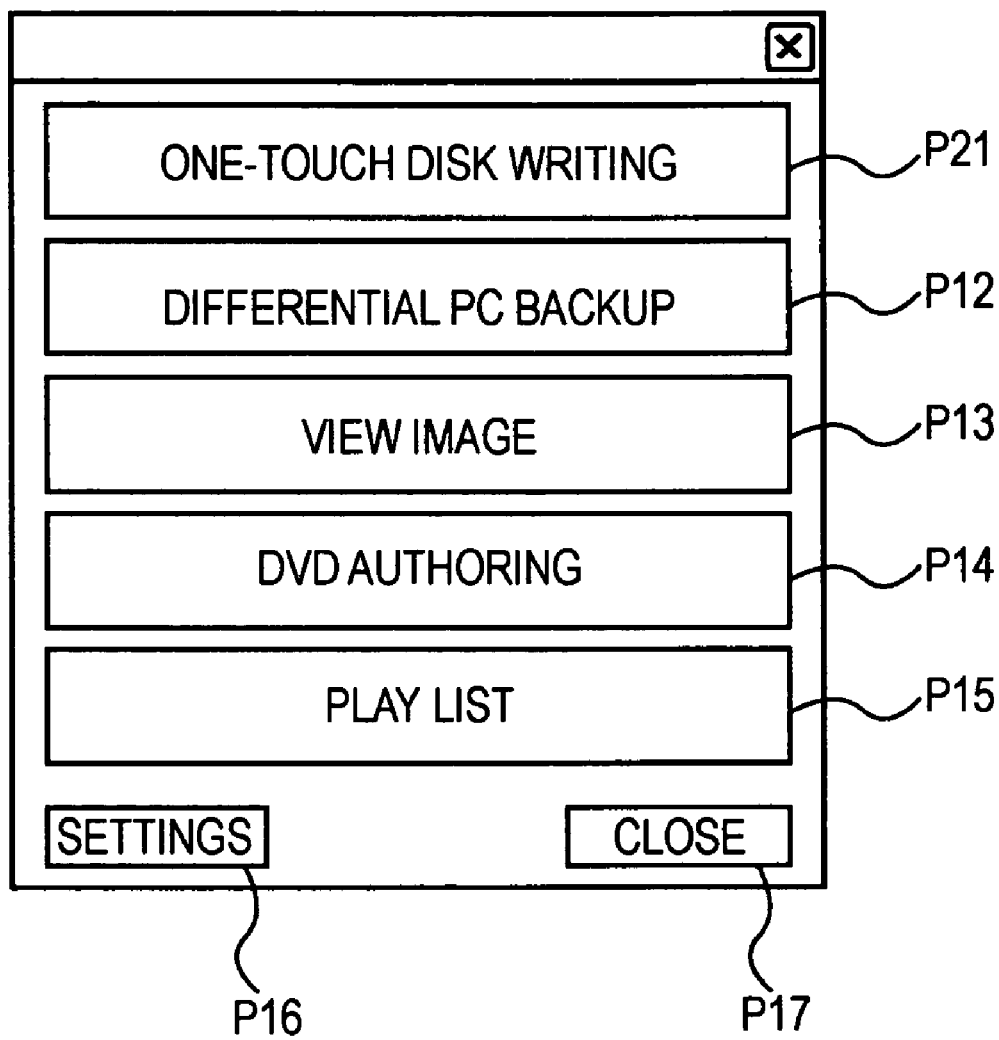
FIG. 18 is a schematic diagram showing a launcher menu screen according to an embodiment of the present invention.

In step SP46, according to the launcher application program, the CPU 30 of the personal computer 4 displays the launcher menu screen LMG2 such as that shown in FIG. 18, in which similar parts to those shown in FIG. 7 are denoted by similar reference numeral, on the monitor 36. This launcher menu screen LMG2 is similar to the launcher menu screen LMG1 except that the "One-Touch DVD Writing" button P11 is replaced with a "One-Touch Disk Writing" button P21.

On this launcher menu screen LMG2, if the "One-Touch Disk Writing" button P21 is clicked by a user, the CPU 30 of the personal computer 4 starts the disk writing program and performs the disk writing process depending on the content type (FIGS. 13 and 14). More specifically, the SD moving image file SDF, the HD moving image file HDF, and the still image file SF supplied from the HDD video camera 102 are respectively recorded on a DVD disk or a Blu-ray disk depending on the file type, thereby obtaining a DVD disk and/or a Blu-ray disk on which the SD moving image file SDF, the HD moving image file HDF, and/or the still image file SF are properly recorded. When the "Write on Disk" button P4 in the pop-up window PW2 of the HDD video camera 102 is touched, the step SP33 and following steps are performed.

Note that the CPU 30 of the personal computer 4 records only SD moving image files SDF, HD moving image files HDF, and/or still image files SF which have not yet recorded on a recording medium. If no such image files are found in the HDD video camera 102, an error message is displayed to inform the user of that there is no new file to be recorded.

When the "Differential PC Backup" button P12 is touched by a user, the CPU 30 of the personal computer 4 determines whether the HDD video camera 102 includes new SD moving image files SDF, HD moving image files HDF, and/or still image files SF which have not yet been stored in the personal computer 4. If such image files are detected, only the detected image files are stored on the hard disk drive 34 of the personal computer 4 or on a DVD disk or a Blu-ray disk. If there is no difference between image files stored in the HDD video camera 102 and image files captured by the personal computer 4, an error message is displayed to inform the user of this fact.

When the "Vie Image" button P13 on the launcher menu screen LMG2 is clicked by a user, the CPU 30 of the personal computer 4 displays an image of the SD moving image file SDF, the HD moving image file HDF, or the still image file. SF captured from the HDD video camera 102 or an image of an image file downloaded from a site on the Internet.

When the "DVD Authoring" button P14 is clicked by a user, the CPU 30 of the personal computer 4 allows the user to edit the SD moving image file SDF, the HD moving image file HDF, or the still image file SF into a desired form in which to record the image file on a DVD disk or a Blu-ray disk. In this case, the SD moving image file SDF, the HD moving image file HDF, or the still image file SF supplied from the HDD video camera 102 is not directly recorded on a DVD disk or a Blu-ray disk but recorded after being edited.

When the "Play List" button P15 is clicked by a user, the CPU 30 of the personal computer 4 records the SD moving image file SDF, the HD moving image file HDF, and/or the still image file SF on a DVD disk or a Blu-ray disk in the order specified in the play list stored in the HDD video camera 102. If the HDD video camera 102 has the play list, the CPU 30 of the personal computer 4 converts the still image file SF compressed in the PEG form into an MPEG2 form so that the still image file SF is allowed to be recorded in the same form as that of the SD moving image file SDF or the HD moving image file HDF, and then the specified image files are recorded on a DVD disk or a Blu-ray disk. When there is no play list, the still image file SF in the JPEG form is directly recorded on a DVD disk or a Blu-ray disk.

That is, when there is a play list, the CPU 30 of the personal computer 4 records the SD moving image file SDF, the HD moving image file HDF, and/or the still image file SF in accordance with the play list on a DVD disk or a Blu-ray disk after converting the still image SF compressed in the JPEG form into the MPEG2 form so that all image files are in the MPEG2 form. This makes it possible even for an optical disk player capable of playing back only MPEG2 moving images to play back still images SF.

In the case in which there is no play list and thus the JPEG still image is directly recorded on a DVD disk or a Blu-ray disk by the CPU 30 of the personal computer 4, if an optical disk player is capable of playing back still image files, it is possible to also read still image file SF and display an image on the monitor 36 according to the still image file SF.

When the "Settings" button P16 is clicked by a user, the CPU 30 of the personal computer 4 allows the user to modify the details of settings of conditions under which to record the SD moving image file SDF, the HD moving image file HDF, and/or the still image file SF on a DVD disk or a Blu-ray disk. When the "Close" button P17 is clicked by a user, the launcher menu screen LGM2 is closed.

Operation and Advantages of the Second Embodiment

In the information processing system 101 configured in the above-described manner according to the second embodiment, when the "Write on Disk" button P4 in the pop-up window PW2 displayed on the LCD 19 of the HDD video camera 102 is touched by a user, the function indemnification file "OTDISCBN.IND" is created and stored on the hard disk drive 16. Furthermore, the camera identification file "MODELCFG.IND" is created in which type information indicating the content type to be recorded by the personal computer 4, and the created camera identification file "MODELCFG.IND" is stored on the hard disk drive 16.

At this stage of the processing, the HDD video camera 102 has completed the pre-process necessary to indirectly control the personal computer 4. When the HDD video camera 102 is logically connected to the personal computer 4, if the personal computer 4 detects the function identification file "OTDISCBN.IND" stored in the HDD video camera 102, then, according to the information processing apparatus control program, the personal computer 4 starts the disk writing program, captures the SD moving image file SDF, the HD moving image file HDF, or the still image file SF according to the type information described in the camera identification file "MODELCFG.IND", and records the captured image file on a DVD disk or a Blu-ray disk depending on the image file type.

Thus, in the state in which the HDD video camera 102 is logically connected to the personal computer 4 such that the HDD video camera 102 operates as a slave device and the personal computer 4 operates as a master device and thus the HDD video camera 102 operating as the slave device is not allowed to directly issue a write-on-disk command to the personal computer 4, use of the function identification file "OTDISCBN.IND" and the camera identification file "MODELCFG.IND" makes it possible for the HDD video camera 102 to indirectly control the personal computer 4 to record a specified content on a DVD disk or a Blu-ray disk depending on the content type. That is, the same effect as that achieved by directly issuing the write-on-disk command to the personal computer 4 can be achieved indirectly.

Thus, the user of the HDD video camera 102 is allowed to transfer the SD moving image file SDF, the HD moving image file HDF, and/or the still image file SF to the personal computer 4 and write them on a DVD disk or a Blu-ray disk simply by touching a button on the HDD video camera 102 without having to operate the personal computer 4 or install a special driver software program on the personal computer 4.

When the CPU 30 of the personal computer 4 determines that the file system FS2 of the HDD video camera 102 does not include the function identification file "OTDISCBN.IND", the CPU 30 of the personal computer 4 displays on the display 36 the launcher menu screen LMG2 corresponding to the camera identification file "MODELCFG.IND". Thus, it is possible to regard that a command to display the launcher menu screen LMG2 is indirectly issued from the HDD video camera 102 to the personal computer 4.

When the CPU 30 of the personal computer 4 detects that the "One-Touch Disk Writing" button P21 on the launcher menu screen LMG2 has been clicked, the CPU 30 of the personal computer 4 reads the SD moving image file SDF, the HD moving image file HDF, and/or the still image file SF from the HDD video camera 102 and records them on a DVD disk or a Blu-ray disk thereby obtaining the DVD disk or the Blu-ray disk on which the files have been recorded. Thus, in the information processing system 101, the operation of writing files on a DVD disk or a Blu-ray disk can be initiated by either the video camera 102 or the personal computer 4. This provides a great improvement in usability.

When the CPU 30 of the personal computer 4 determines that the HDD video camera 102 has an SD moving image file SDF, an HD moving image file HDF, and/or a still image file SF which have not yet been recorded by the personal computer 4, the CPU 30 of the personal computer 4 can additionally record only these files on a DVD disk or a Blu-ray disk. This prevents the same content as that already existing on the DVD disk or the Blu-ray disk from being recorded in a duplicated manner. Thus, it is possible to use recording media in an efficient manner.

In the information processing system 101, as described above, even in the state in which the personal computer 4 is set to serve as a master device and the HDD video camera 102 is set to serve as a slave device after they have been connected to each other, a user is allowed to, simply by touching a button on the HDD video camera 102, transfer an SD moving image file SDF, an HD moving image file HDF, and/or a still image file SF from the HDD video camera 102 to the personal computer 4 and write them on a DVD disk or a Blu-ray disk suitable for recording the files depending on the content type thereby easily obtaining a DVD disk or a Blu-ray disk on which the files have been recorded.

Other Embodiments

In the information processing system 1 according to the first embodiment described above, it is assumed that the moving image file DF and/or the still image file SF to be recorded are supplied to the personal computer 4 from the hard disk drive 16 disposed in the inside of the of the HDD video camera 2. Alternatively, image files to be recorded may be supplied to the personal computer 4 from another type of recording medium such as a removable video tape, a DVD disk, or a semiconductor memory mounted on a video camera.

In the information processing system 101 according to the second embodiment described above, it is assumed that the SD moving image file SDF, the HD moving image file HDF, and/or the still image file SF to be recorded on a Blu-ray disk or a DVD disk are supplied to the personal computer 4 from the hard disk drive disposed in the inside of the HDD video camera 102. Alternatively, the SD moving image file SDF, the HD moving image file HDF, and/or the still image file SF to be recorded may be supplied to the personal computer 4 from another type of recording medium such as a high-capacity storage disk or a high-capacity semiconductor memory mounted on a video camera.

In the first and second embodiments described above, it is assumed that the hard disk drive 16 is firmly disposed in the inside of the HDD video camera 2 or 102. Alternatively, the hard disk drive 16 may be removably attached to the video camera 2 or 102.

In the first embodiment described above, when the "Write on DVD" button P2 in the pop-up window PW1 is touched by a user, the HDD video camera 2 produces the function identification file "DVDBURN.IND" which causes the personal computer 4 to start the process of writing files on a DVD disk. Alternatively, for example, a "Memory Stick (trademark of Sony Corp.) Writing" button may be disposed in the pop-up window PW1 so that when the "Memory Stick Writing" button is pressed, a function identification file for causing the personal computer 4 to perform a process of writing files in a memory stick may be produced and stored.

In the first embodiment described above, the "Write on DVD" button P2 is displayed in the pop-up window PW1 so that a user is allowed to operate it by touching it. Alternatively, the "Write on DVD" button P2 may be formed by hardware on a case of the HDD video camera 2 so that a user is allowed to operate it by pressing it.

In the second embodiment described above, the "Write on Disk" button P4 is displayed in the pop-up window PW2 so that a user is allowed to operate it by touching it. Alternatively, a "Write on Disk" button may be formed by hardware on a case of the HDD video camera 102 so that a user is allowed to operate it by pressing it.

In the first and second embodiments described above, when the HDD video camera 2 or 102 is electrically (physically) connected to the personal computer 4, the pop-up window PW1 or PW2 is displayed on the LCD 16 of the HDD video camera 2 or 102. Alternatively, the pop-up window PW1 or PW2 may be displayed on the LCD 19 when a button in a menu is touched even in a state in which the HDD video camera 2 or 102 is not electrically (physically) connected to the personal computer 4, and the HDD video camera 2 or 102 may produce the function identification file "DVDBURN.IND" or "OTDISCBN.IND" when a button in the pop-up window PW1 or PW2 is touched.

In the first and second embodiments described above, when the CPU 30 of the personal computer 4 detects the presence of the function identification file "DVDBURN.IND" in the file system FS1 of the HDD video camera 2 or the presence of the function identification file "OTDISCBN.IND" in the file system FS2 of the HDD video camera 102, the DVD writing program or the disk writing program stored in the hard disk drive 24 is started by the information processing apparatus control program resident in the RAM 22. Alternatively, the information processing apparatus control program may be installed from a storage medium such as a CD-ROM or a DVD disk or may be downloaded from a site on the Internet.

In the first and second embodiments described above, the information processing system 1 or 101 is formed by connecting the personal computer 4 serving as the information processing apparatus to the HDD video camera 2 or 102 serving ass the slave device. Alternatively, an information processing system may be formed by connecting an information processing apparatus capable of executing various application programs to realize various functions, such as a portable telephone device or a PDA (Personal Digital Assistant) device, to an electronic apparatus serving as a content output apparatus capable of taking an image and outputting it such as a portable telephone device, a PDA device, or a notebook personal computer.

In the first embodiment described above, a moving image file DF is transferred as content data from the HDD video camera 2 to the personal computer 4 and is recorded on a DVD disk. Alternatively, other types of data such as a still image file, an audio file, a gram program file, a text file, etc. may be transferred to the personal computer 4 and recorded on a DVD disk.

In the second embodiment described above, an SD moving image file SDF, an HD moving image file HDF, and/or a still image file SF are transferred as content data from the HDD video camera 102 to the personal computer 4 and recorded on a DVD disk or a Blu-ray disk depending on the content type. Alternatively, other types of data such as an audio file, a gram program file, a text file, etc. may be transferred to the personal computer 4 and recorded on a DVD disk and may be recorded on a DVD disk or a Blu-ray disk depending on the data size or the data format.

In the first embodiment described above, after the HDD video camera 2 is electrically (physically) connected to the personal computer 4, when the "Write on DVD" button P2 is touched, the function identification file "DVDBURN.IND" is created. Alternatively, when the "Write on DVD" button P2 is touched at an arbitrary time before or after the HDD video camera 2 is electrically (physically) connected to the personal computer 4, the function identification file "DVDBURN.IND" may be created.

In the second embodiment described above, after the HDD video camera 102 is electrically (physically) connected to the personal computer 4, when the "Write on Disk" button P4 is touched, the function identification file "OTDISCBN.IND" and the camera identification file "MODELCFG.IND" are created. Alternatively, when the "Write on Disk" button P4 is touched at an arbitrary time after or before the HDD video camera 102 is electrically (physically) connected to the personal computer 4, the function identification file "OTDISCBN.IND" and the camera identification file "MODELCFG.IND" may be created.

In the second embodiment described above, the determination is made in step SP40 as to whether the content data should be recorded on a Blu-ray disk, which is a disk of the type suitable for recording an HD moving image file HDF, and the determination is further made in step SP42 as to whether the content data should be recorded on a DVD disk, which a disk of the type suitable for recording an SD moving image file SDF. Alternatively, the determination in step SP42 may be made first and then the determination in step SP40 may be made.

In the first and second embodiments described above, when the HDD video camera 2 or 102 has a play list, still image files SF compressed in the JPEG form are converted into the MPEG2 form and recorded together with other image files in the MPEG2 form, while JPEG still image files SF are directly recorded without being converted into the MPEG2 form when there is no play list. Alternatively, regardless of whether there is a play list, still image files SF compressed in the JPEG form may be converted into the MPEG2 form before being recorded or may be directly recorded without being converted.

In the first and second embodiments described above, the HDD video camera 2 or 102 serving as the content output apparatus is assumed to be configured so as to include the CPU 10 serving as the function identification file creation means and the type identification file generation means and so as to include the RAM 12 serving as the file storage means, while the personal computer 4 serving as the information processing apparatus is assumed to be configured so as to include the USB interface 28 serving as the detection means and the CPU 30 serving as the control means. Alternatively, one or all of the function identification file creation means, the type identification file generation means, and the file storage means in the content output apparatus may be realized in another circuit configuration, and one or both of the detection means and the control means of the information processing apparatus may be realized in another circuit configuration.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing system including an information processing apparatus and a content output apparatus which are connected to each other, the content output apparatus including:
    function identification file creation means for, in accordance with a button operation by a user when the content output apparatus is controlled to be in a state in which the content output apparatus is electrically connected and not logically connected to the information processing apparatus, creating a function identification file for causing the information processing apparatus to execute a predetermined function; and file storage means for storing the function identification file in storage means of the content output apparatus, the information processing apparatus including:
       detection means for detecting a logical connection of the content output apparatus to the information processing apparatus; and
    control means for, after detecting the logical connection of the content output apparatus, starting an application program to execute the function depending on the presence/absence of the function identification file stored in the storage means, wherein the function executed by the information processing apparatus is to record content outputted from the content output apparatus into a recording medium attachable to or part of the information processing apparatus, wherein when the logical connection between the information processing apparatus and the content output apparatus is released, the file storage means deletes the function identification file from the storage means.

2. The information processing system according to claim 1, wherein the content output apparatus creates the function identification file in accordance with a command, issued by a user by operating a button, to record an image captured via an imaging unit on a recoding medium.

3. The information processing system according to claim 1, wherein the file storage means stores the function identification file directly under a root directory.

4. A content output apparatus connectable with an information processing apparatus, comprising:
    function identification file creation means for, after the content output apparatus is connected to the information processing apparatus, creating a predetermined function identification file in accordance with a button operation performed by a user when the content output apparatus is controlled to be in a state in which the content output apparatus is electrically connected and not logically connected to the information processing apparatus, to cause the information processing apparatus to start after detection of a logical connection of the content output apparatus to the information processing apparatus, a predetermined application program to execute a predetermined function depending on whether the predetermined function identification file exists in the content output apparatus, wherein the function executed by the information processing apparatus is to record content outputted from the content output apparatus into a recording medium attachable to or a part of the information processing apparatus, wherein when the logical connection between the information processing apparatus and the content output apparatus is released, the file storage means deletes the function identification file from the storage means; and file storage means for storing the function identification file in storage means.

5. A method of controlling an information processing apparatus by a content output apparatus connected to the information processing apparatus, comprising the steps of:
    after the content output apparatus is electrically connected to the information processing apparatus, creating a predetermined function identification file, in accordance with a button operation performed by a user when the content output apparatus is controlled to be in a state in which the content output apparatus is electrically connected and not logically connected to the information processing apparatus, to cause the information processing apparatus to start a predetermined application program to execute a predetermined function depending on whether the predetermined function identification file exists in the content output apparatus, wherein the function executed by the information processing apparatus is to record content outputted from the content output apparatus into a recording medium attachable to or a part of the information processing apparatus;
    storing the function identification file in storage means of the content output apparatus; and
    when a logical connection of the content output apparatus to the information processing apparatus is detected, starting the application program depending on whether the function identification file exists in the storage means, wherein when the logical connection between the information processing apparatus and the content output apparatus is released, the file storage means deletes the function identification file from the storage means.

6. A program on a computer-readable medium of controlling an information processing apparatus by a content output apparatus connected to the information processing apparatus, comprising the steps of:
    after the content output apparatus is electrically connected to the information processing apparatus, creating a predetermined function identification file, in accordance with a button operation performed by a user when the content output apparatus is controlled to be in a state in which the content output apparatus is electrically connected and not logically connected to the information processing apparatus, to cause the information processing apparatus to start a predetermined application program to execute a predetermined function depending on whether the predetermined function identification file exists in the content output apparatus, wherein the function executed by the information processing apparatus is to record content outputted from the content output apparatus into a recording medium attachable to or a part of the information processing apparatus;
    storing the function identification file in storage means of the content output apparatus; and when a logical connection of the content output apparatus to the information processing apparatus is detected, starting the application program depending on whether the function identification file exists in the storage means, wherein when the logical connection between the information processing apparatus and the content output apparatus is released, the file storage means deletes the function identification file from the storage means.

7. An information processing system including an information processing apparatus and a content output apparatus which are connected to each other, the content output apparatus including:
function identification file creation means for creating, when the content output apparatus is controlled to be in a state in which the content output apparatus is electrically connected and not logically connected to the information processing apparatus, a function identification file for causing the information processing apparatus to record, on a recording medium, content data stored in and outputted from the content output apparatus;
type identification file creation means for, if a content type of content data to be recorded on the recording medium is selected, creating a type identification file in which type information indicating the content type is described; and
file storage means for storing the function identification file and the type identification file in storage means of the content output apparatus, the information processing apparatus including:
detection means for detecting a logical connection of the content output apparatus to the information processing apparatus; and
control means for, after detecting the logical connection of the content output apparatus, starting an application program to record the content data on the recording medium depending on the presence/absence of the function identification file stored in the storage means, and recording on the recording medium the content data stored in and outputted from the content output apparatus in accordance with the type information described in the type information file, wherein when the logical connection between the information processing apparatus and the content output apparatus is released, the file storage means deletes the function identification file and/or the type identification file from the storage means.

8. The information processing system according to claim 7, wherein the control means records the content data stored in the content output apparatus on a recording medium of a type corresponding to the content type.

9. The information processing system according to claim 7, wherein the content output apparatus creates the function identification file and the type identification file, in accordance with a command issued by a user by operating a button to record an image captured via an imaging unit on the recording medium.

10. The information processing system according to claim 7, wherein the file storage means stores the function identification file and the type identification file directly under a root directory.

11. A content output apparatus connectable with an information processing apparatus, comprising:
function identification file creation means for creating, when the content output apparatus is controlled to be in a state in which the content output apparatus is electrically connected and not logically connected to the information processing apparatus, a function identification file for causing the information processing apparatus to start an application program to record, on a recording medium, content data stored in and outputted from the content output apparatus;
type identification file creation means for, if a content type of content data to be recorded on the recording medium is selected, creating a type identification file in which type information indicating the content type is described; and
file storage means for storing the function identification file and the type identification file in storage means of the content output apparatus, wherein the information processing apparatus starts, after detection of a logical connection of the content output apparatus to the information processing apparatus, the application program to record depending on whether the function identification file exists in the storage means, wherein when the logical connection between the information processing apparatus and the content output apparatus is released, the file storage means deletes the function identification file and/or the type identification file from the storage means.

12. A method of controlling an information processing apparatus by a content output apparatus connected to the information processing apparatus, comprising the steps of:
when the content output apparatus is controlled to be in a state in which the content output apparatus is electrically connected and not logically connected to the information processing apparatus, creating a function identification file for causing the information processing apparatus to start an application program to record, on a recording medium, content data stored in and outputted from the content output apparatus;
if a content type of content data to be recorded on the recording medium is selected, creating a type identification file in which type information indicating the content type is described;
storing the function identification file and the type identification file in storage means of the content output apparatus; and
if a logical connection of the content output apparatus to the information processing apparatus is detected, starting an application program to record the content data on the recording medium depending on the presence/absence of the function identification file stored in the storage means, and recording on the recording medium the content data stored in and outputted from the content output apparatus in accordance with the type information described in the type information file, wherein when the logical connection between the information processing apparatus and the content output apparatus is released, the file storage means deletes the function identification file and/or the type identification file from the storage means.

13. A program on a computer-readable medium of controlling an information processing apparatus by a content output apparatus connected to the information processing apparatus, comprising the steps of:
when the content output apparatus is controlled to be in a state in which the content output apparatus is electrically connected and not logically connected to the information processing apparatus, creating a function identification file for causing the information processing apparatus to start an application program to record, on a recording medium, content data stored in and outputted from the content output apparatus;

if a content type of content data to be recorded on the recording medium is selected, creating a type identification file in which type information indicating the content type is described;

storing the function identification file and the type identification file in storage means of the content output apparatus; and if a logical connection of the content output apparatus to the information processing apparatus is detected, starting an application program to record the content data on the recording medium depending on the presence/absence of the function identification file stored in the storage means, and recording on the recording medium the content data stored in and outputted from the content output apparatus in accordance with the type information described in the type information file, wherein when the logical connection between the information processing apparatus and the content output apparatus is released, the file storage means deletes the function identification file and/or the type identification file from the storage means.

14. An information processing system including an information processing apparatus and a content output apparatus which are connected to each other, the content output apparatus including:

a function identification file creation unit adapted to, in accordance with a button operation by a user when the content output apparatus is controlled to be in a state in which the content output apparatus is electrically connected and not logically connected to the information processing apparatus, create a function identification file for causing the information processing apparatus to execute a predetermined function; and a file storage unit adapted to store the function identification file in a storage unit of the content output apparatus, the information processing apparatus including:

a detector adapted to detect a logical connection of the content output apparatus to the information processing apparatus; and a controller adapted to, after detecting the logical connection of the content output apparatus, start an application program to execute the function depending on the presence/absence of the function identification file stored in the storage unit, wherein the function executed by the information processing apparatus is to record content outputted from the content output apparatus into a recording medium attachable to or a part of the information processing apparatus, wherein when the logical connection between the information processing apparatus and the content output apparatus is released, the file storage means deletes the function identification file and/or the type identification file from the storage means.

15. A content output apparatus connectable with an information processing apparatus, comprising:

a function identification file creation unit adapted to, after the content output apparatus is electrically connected to the information processing apparatus, create a predetermined function identification file, in accordance with a button operation performed by a user when the content output apparatus is controlled to be in a state in which the content output apparatus is electrically connected and not logically connected to the information processing apparatus, to cause the information processing apparatus to start, after detection of a logical connection of the content output apparatus to the information processing apparatus, a predetermined application program to execute a predetermined function depending on whether the predetermined function identification file exists in the content output apparatus, wherein the function executed by the information processing apparatus is to record content outputted from the content output apparatus into a recording medium attachable to or a part of the information processing apparatus; and a file storage unit adapted to store the function identification file in a storage unit of the content output apparatus, wherein when the logical connection between the information processing apparatus and the content output apparatus is released, the file storage means deletes the function identification file and/or the type identification file from the storage means.

16. An information processing system including an information processing apparatus and a content output apparatus which are connected to each other, the content output apparatus including:

a function identification file creation unit adapted to create, when the content output apparatus is controlled to be in a state in which the content output apparatus is electrically connected and not logically connected to the information processing apparatus, a function identification file for causing the information processing apparatus to record, on a recording medium, content data stored in and outputted from the content output apparatus;

a type identification file creation unit adapted to, if a content type of content data to be recorded on the recording medium is selected, create a type identification file in which type information indicating the content type is described; and a file storage unit adapted to store the function identification file and the type identification file in a storage unit of the content output apparatus, the information processing apparatus including:

a detector adapted to detect a logical connection of the content output apparatus to the information processing apparatus; and a controller adapted to, after detecting the logical connection of the content output apparatus, start an application program to record the content data on the recording medium depending on the presence/absence of the function identification file stored in the storage unit, and recording on the recording medium the content data stored in and outputted from the content output apparatus in accordance with the type information described in the type information file, wherein when the logical connection between the information processing apparatus and the content output apparatus is released, the file storage means deletes the function identification file and/or the type identification file from the storage means.

17. A content output apparatus connectable with an information processing apparatus, comprising:

a function identification file creation unit adapted to create, when the content output apparatus is controlled to be in a state in which the content output apparatus is electrically connected and not logically connected to the information processing apparatus, a function identification file for causing the information processing apparatus to start an application program to record, on a recording medium, content data stored in and outputted from the content output apparatus;

a type identification file creation unit adapted to, if a content type of content data to be recorded on the recording medium is selected, create a type identification file in which type information indicating the content type is described; and a file storage unit adapted to store the function identification file and the type identification file in a storage unit, wherein the information processing apparatus, after detection of a logical connection of the content output apparatus to the information processing apparatus, starts the application program to record depending on whether the function identification file exists in the file storage unit, wherein when the logical connection between the information processing apparatus and the content output apparatus is released, the file storage means deletes the function identification file and/or the type identification file from the storage means.

* * * * *